US012601898B2

(12) United States Patent    (10) Patent No.:   US 12,601,898 B2

Miyagishima et al.    (45) Date of Patent:    Apr. 14, 2026

(54) IMAGING LENS AND IMAGING APPARATUS

(71) Applicant: FUJIFILM Corporation, Tokyo (JP)

(72) Inventors: Shunsuke Miyagishima, Saitama (JP); Hiroki Saito, Saitama (JP); Kosuke Takahashi, Saitama (JP); Tomoki Otsuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 314 days.

(21) Appl. No.: 18/470,035

(22) Filed: Sep. 19, 2023

(65) Prior Publication Data

US 2024/0004167 A1    Jan. 4, 2024

Related U.S. Application Data

(63) Continuation of application No. PCT/JP2022/005198, filed on Feb. 9, 2022.

(30) Foreign Application Priority Data

Mar. 29, 2021    (JP) ................................. 2021-056174

(51) Int. Cl.
   *G02B 13/00*      (2006.01)
   *G02B 27/64*      (2006.01)
   *H04N 23/951*     (2023.01)

(52) U.S. Cl.
   CPC ....... *G02B 13/0045* (2013.01); *H04N 23/951* (2023.01); *G02B 27/646* (2013.01)

(58) Field of Classification Search
   CPC ........ G02B 15/26; G02B 15/17; G02B 15/15; G02B 15/143107; G02B 15/143105;

(Continued)

(56) References Cited

U.S. PATENT DOCUMENTS

2012/0229921 A1* 9/2012 Eguchi ........... G02B 15/143107
                                               359/784
2018/0100989 A1 4/2018 Kondo
              (Continued)

FOREIGN PATENT DOCUMENTS

JP      2015-075509 A    4/2015
JP      2016-051100 A    4/2016
              (Continued)

OTHER PUBLICATIONS

An Office Action; "Notice of Reasons for Refusal," mailed by the Japanese Patent Office on Aug. 5, 2025, which corresponds to Japanese Patent Application No. 2023-510598 and is related to U.S. Appl. No. 18/470,035; with English language translation.

(Continued)

*Primary Examiner* — Travis S Fissel
(74) *Attorney, Agent, or Firm* — Studebaker Brackett PLLC

(57)          ABSTRACT

The imaging lens includes, successively in order from a position closest to an object side: a first lens group that remains stationary with respect to an image plane during focusing; and a focus lens group that moves along an optical axis during focusing. Assuming that a maximum image height is Ymax, and a focal length of the imaging lens is f, and a sum of a back focal length in terms of an air-equivalent distance and a distance on the optical axis from a lens surface closest to the object side to a lens surface closest to the image side is TL, the imaging lens satisfies Conditional Expressions (1) and (2).

$$0.1 < Ymax/f < 0.26 \tag{1}$$

$$0.4 < TL/f < 1.1 \tag{2}$$

18 Claims, 23 Drawing Sheets

(58) Field of Classification Search
CPC .... G02B 15/143103; G02B 15/143101; G02B
15/1431; G02B 15/143; G02B 15/146;
G02B 13/009; G02B 13/18; G02B 13/16;
G02B 13/0015; G02B 13/0045; G02B
13/00; G02B 9/62; G02B 9/64; G02B
27/0025; G02B 27/0012; G02B 27/0172;
G02B 27/646; H04N 5/222; H04N
5/2254; H04N 23/951
USPC ......... 359/708, 656–658, 713, 749, 756–762
See application file for complete search history.

(56) References Cited

U.S. PATENT DOCUMENTS

| | | | |
|---|---|---|---|
| 2020/0341247 | A1 | 10/2020 | Yamazoe et al. |
| 2021/0041665 | A1* | 2/2021 | Iwamoto ............ G02B 13/0035 |

FOREIGN PATENT DOCUMENTS

| | | |
|---|---|---|
| JP | 2018-060079 A | 4/2018 |
| JP | 2020-160100 A | 10/2020 |
| JP | 2020-181000 A | 11/2020 |

OTHER PUBLICATIONS

International Search Report issued in PCT/JP2022/005198; mailed
Apr. 26, 2022.
Written Opinion of the International Searching Authority issued in
PCT/JP2022/005198; mailed Apr. 26, 2022.

\* cited by examiner

FIG. 2

EXAMPLE 1

EXAMPLE1

FIG. 4

EXAMPLE 2

EXAMPLE 2

FIG. 6

EXAMPLE 3

EXAMPLE 3

FIG. 8

EXAMPLE 4

EXAMPLE 4

FIG. 10

EXAMPLE 5

EXAMPLE 5

FIG. 12

EXAMPLE 6

EXAMPLE 6

FIG. 14

EXAMPLE 7

EXAMPLE 7

FIG. 16

EXAMPLE 8

EXAMPLE 8

IMAGING LENS AND IMAGING APPARATUS

CROSS-REFERENCE TO RELATED APPLICATIONS

This application is a continuation application of International Application No. PCT/JP2022/005198, filed on Feb. 9, 2022, which claims priority from Japanese Patent Application No. 2021-056174, filed on Mar. 29, 2021. The entire disclosure of each of the above applications is incorporated herein by reference.

BACKGROUND

Technical Field

A technique of the present disclosure relates to an imaging lens and an imaging apparatus.

Related Art

In the related art, as an imaging lens used in an imaging apparatus such as a digital camera or a video camera, for example, lens systems described in JP2020-160100A and JP2018-060079A are known.

SUMMARY

In recent years, there has been a demand for an imaging lens which is configured to be compact and lightweight and which has favorable optical performance.

The present disclosure has been made in view of the above circumstances, and an object of the present disclosure is to provide an imaging lens which is configured to be compact and lightweight and which has favorable optical performance, and an imaging apparatus comprising the imaging lens.

According to an aspect of the present disclosure, there is provided an imaging lens including, successively in order from a position closest to an object side to an image side: a first lens group that remains stationary with respect to an image plane during focusing; and a focus lens group that moves along an optical axis during focusing. Assuming that a maximum image height is Ymax, a focal length of the whole system in a state where an infinite distance object is in focus is f, and a sum of a back focal length in terms of an air-equivalent distance and a distance on the optical axis from a lens surface closest to the object side in the first lens group to a lens surface closest to the image side in the whole system in a state where the infinite distance object is in focus is TL, Conditional Expressions (1) and (2) are satisfied, which are represented by $$0.1 < Ymax/f < 0.26 \tag{1}, \text{and}$$

$$0.4 < TL/f < 1.1 \tag{2}.$$

Assuming that an amount of distortion at an image height, which is 50% of the maximum image height in a state where the infinite distance object is in focus, is Dst5, and an amount of distortion at the maximum image height in a state where the infinite distance object is in focus is Dst10, it is preferable that the imaging lens according to the above-mentioned aspect satisfies Conditional Expression (3), which is represented by $$0.2 < |Dst5/Dst10| < 0.6 \tag{3}.$$

Assuming that a distance on the optical axis from the image plane to an exit pupil position in a state where the infinite distance object is in focus is Pe, where a sign of Pe is positive in a case where the exit pupil position is closer to the object side than the image plane, and is negative in a case where the exit pupil position is closer to the image side than the image plane, it is preferable that the imaging lens according to the above-mentioned aspect satisfies Conditional Expression (4), which is represented by $$1.5 < Pe/Ymax < 3 \tag{4}.$$

It is preferable that the imaging lens according to the above-mentioned aspect further comprises a negative lens closest to the image side. Assuming that a curvature radius of an object side surface of the negative lens is Rf, and a curvature radius of an image side surface of the negative lens is Rr, it is preferable that the imaging lens according to the above-mentioned aspect satisfies Conditional Expression (5), which is represented by $$-0.6 < (Rf-Rr)/(Rf+Rr) < -0.1 \tag{5}.$$

It is preferable that the imaging lens according to the above-mentioned aspect further comprises a positive lens subsequent to the negative lens on the object side of the negative lens. Assuming that a curvature radius of an object side surface of the negative lens is Rf, and a curvature radius of an image side surface of the positive lens is Rpr, it is preferable that the imaging lens according to the above-mentioned aspect satisfies Conditional Expression (6), which is represented by $$0.03 < (Rpr-Rf)/(Rpr+Rf) < 0.4 \tag{6}.$$

Assuming that an Abbe number of the negative lens based on a d line is vn, it is preferable that the imaging lens according to the above-mentioned aspect satisfies Conditional Expression (7), which is represented by $$12 < vn < 30 \tag{7}.$$

Assuming that a distance on an optical axis from a lens surface closest to the object side in the first lens group to a lens surface closest to the image side in the first lens group is DG1, it is preferable that the imaging lens of the above-mentioned aspect satisfies Conditional Expression (8), which is represented by $$0.02 < DG1/f < 0.2 \tag{8}.$$

Assuming that a maximum half angle of view in a state where the infinite distance object is in focus is ω, and an angle between an axis parallel to the optical axis and a principal ray with the maximum image height toward the image plane from a lens closest to the image side in a state where the infinite distance object is in focus is ωi, it is preferable that the imaging lens according to the above-mentioned aspect satisfies Conditional Expression (9), which is represented by $$1.4 < \tan \omega i/\tan \omega < 3.6 \tag{9}.$$

Assuming that a maximum effective diameter of the lens surface closest to the object side in the first lens group is φf, and a maximum effective diameter of the lens surface closest to the image side in the whole system is φr, it is preferable that the imaging lens according to the above-mentioned aspect satisfies Conditional Expression (10), which is represented by $$0.2 < \varphi f/\varphi r < 1.5 \tag{10}.$$

Assuming that a back focal length in terms of the air-equivalent distance in a state where the infinite distance object is in focus is Bf, it is preferable that the imaging lens according to the above-mentioned aspect satisfies Conditional Expression (11), which is represented by $$0.4 < Bf/Ymax < 1.8 \tag{11}$$

It is preferable that the focus lens group has a negative refractive power as a whole. It is preferable that the number of lenses included in the focus lens group is equal to or less than two.

Assuming that a focal length of the first lens group is f1, it is preferable that the imaging lens according to the above-mentioned aspect satisfies Conditional Expression (12), which is represented by $$0.25 < f1/f < 0.5 \tag{12}$$

It is preferable that the imaging lens according to the above-mentioned aspect consists of, in order from the object side to the image side, the first lens group, the focus lens group that has a negative refractive power as a whole, and a rear lens group that remains stationary with respect to the image plane during focusing. Assuming that a focal length of the rear lens group is fR, it is preferable that the imaging lens according to the above-mentioned aspect satisfies Conditional Expression (13), which is represented by $$-0.9 < fR/f < -0.1 \tag{13}$$

The imaging lens of the above-mentioned aspect is provided in an imaging apparatus. The imaging apparatus may be configured to include an imaging element that captures an optical image formed by the imaging lens, and be capable of outputting an image having an angle of view narrower than a maximum imaging angle of view of the imaging element. Further, the imaging apparatus may be configured to be capable of outputting the image having the angle of view narrower than the maximum imaging angle of view of the imaging element by using a composite image which is obtained by synthesizing a plurality of images captured by the imaging element.

According to another aspect of the present disclosure, there is provided an imaging apparatus comprising the imaging lens according to the above-mentioned aspect.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, it should be noted that the term "single lens" means one uncemented lens. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The sign of the refractive power, the curvature radius, and the surface shape of the lens including the aspherical surface will be used in terms of the paraxial region unless otherwise specified. The sign of the curvature radius of the convex surface facing toward the object side is positive, and the sign of the curvature radius of the convex surface facing toward the image side is negative.

In the present specification, the term "whole system" means an imaging lens. The "back focal length in terms of the air-equivalent distance" is the air-equivalent distance on the optical axis from the lens surface closest to the image side in the whole system to the image plane in a state where the infinite distance object is in focus. The "focal length" used in a conditional expression is a paraxial focal length. The values used in conditional expressions are values in a case where the d line is set as a reference.

The "d line", "C line", and "F line" described in the present specification are bright lines. In the present specification, it is assumed that the d line wavelength is 587.56 nm (nanometers), the C line wavelength is 656.27 nm (nanometers), and the F line wavelength is 486.13 nm (nanometers).

According to the present disclosure, it is possible to provide an imaging lens which is configured to be compact and lightweight and has favorable optical performance, and an imaging apparatus comprising the imaging lens.

BRIEF DESCRIPTION OF THE DRAWINGS

FIG. 2 is a cross-sectional view showing a configuration of an imaging lens of Example 1.

FIG. 4 is a cross-sectional view showing a configuration of an imaging lens of Example 2.

FIG. 6 is a cross-sectional view showing a configuration of an imaging lens of Example 3.

FIG. 8 is a cross-sectional view showing a configuration of an imaging lens of Example 4.

FIG. 10 is a cross-sectional view showing a configuration of an imaging lens of Example 5.

FIG. 12 is a cross-sectional view showing a configuration of an imaging lens of Example 6.

FIG. 14 is a cross-sectional view showing a configuration of an imaging lens of Example 7.

FIG. 16 is a cross-sectional view showing a configuration of an imaging lens of Example 8.

FIG. 20 is a diagram showing a technique of pixel shift.

FIG. 21 is a diagram showing a technique of pixel shift.

DESCRIPTION OF EMBODIMENTS

Hereinafter, embodiments of the present disclosure will be described with reference to the accompanying drawings.

Figure 1:
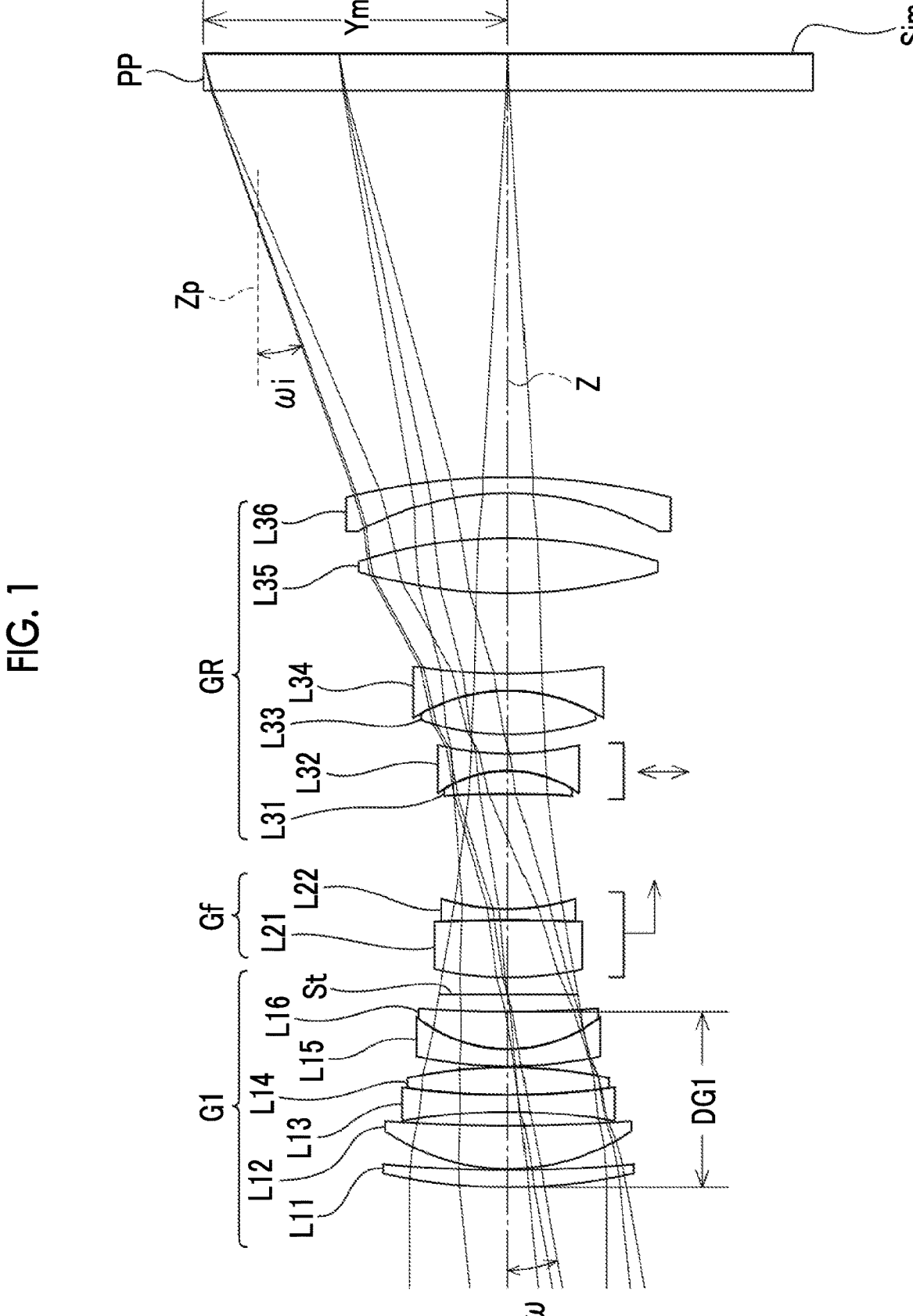
FIG. 1 is a cross-sectional view showing a configuration and a luminous flux of an imaging lens according to an embodiment, which corresponds to the imaging lens of Example 1.

FIG. 1 shows a cross-sectional view of the configuration and luminous flux of the imaging lens according to the embodiment of the present disclosure in a state where the infinite distance object is in focus. The "infinite distance object" in the present specification is an object in which the distance on the optical axis Z from the object to the lens surface closest to the object side in the imaging lens is infinite. FIG. 1 shows, as the luminous flux, an on-axis luminous flux, a luminous flux with an intermediate image height, and a luminous flux with the maximum image height. The example shown in FIG. 1 corresponds to the imaging lens according to Example 1 to be described later. In FIG. 1, the left side is the object side and the right side is the image side.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens shown in FIG. 1 includes, successively in order from a position closest to an object side to an image side along an optical axis Z: a first lens group G1 that remains stationary with respect to an image plane Sim during focusing; and a focus lens group Gf that moves along the optical axis Z during focusing. Since the lens group closest to the object side is likely to have a large diameter, by adopting the above-mentioned configuration of the imaging lens, there is an advantage in achieving reduction in size and weight of the focus drive mechanism. The arrow pointing to the right below the focus lens group Gf in FIG. 1 indicates that the focus lens group Gf moves to the image side during focusing from the infinite distance object to a close range object.

For example, the imaging lens of FIG. 1 is configured as follows. The imaging lens of FIG. 1 consists of, in order from the object side to the image side, a first lens group G1 that remains stationary with respect to the image plane Sim during focusing, a focus lens group Gf that moves along the optical axis Z during focusing, and a rear lens group GR that remains stationary with respect to the image plane Sim during focusing. The first lens group G1 consists of six lenses L11 to L16 and an aperture stop St, in order from the object side to the image side. The focus lens group Gf consists of two lenses L21 and L22, in order from the object side to the image side. The rear lens group GR consists of six lenses L31 to L36, in order from the object side to the image side. It should be noted that the aperture stop St of FIG. 1 does not indicate the size and shape, but indicates the position in the direction of the optical axis Z.

In the example of FIG. 1, a lens group that moves during focusing is only one lens group of the focus lens group Gf. In the example of FIG. 1, during focusing, the lens L21 and the lens L22 constituting the focus lens group Gf move integrally along the optical axis Z. The term "move integrally" in the present specification means that the same amount of movement is performed in the same direction at the same time.

Hereinafter, preferable configurations and possible configurations of the imaging lens of the present embodiment will be described. It should be noted that, in the following description of preferable configurations and possible configurations, the "imaging lens of the present embodiment" is also simply referred to as an "imaging lens" in order to avoid redundancy.

It is preferable that the focus lens group Gf has a negative refractive power as a whole. In such a case, there is an advantage in suppressing fluctuation in chromatic aberration during focusing.

It is preferable that the number of lenses included in the focus lens group Gf is two or less. In such a case, there is an advantage in achieving reduction in weight of the focus lens group Gf.

In a case where one lens component is a group of cemented lenses or one single lens, the focus lens group Gf may be configured to consist of one lens component disposed subsequent to the aperture stop St. In such a case, there is an advantage in achieving reduction in size and weight of the focus lens group Gf. In a case where the focus lens group Gf consists of a cemented lens in which a positive lens and a negative lens are cemented, there is an advantage in suppressing fluctuation in chromatic aberration during focusing. In a case where the focus lens group Gf consists of one single lens, there is an advantage in achieving reduction in size and weight.

It is preferable that the first lens group G1 has a positive refractive power as a whole. In such a case, there is an advantage in achieving reduction in size of the imaging lens in the optical axis Z direction and the radial direction.

Assuming that a maximum image height is Ymax and a focal length of the whole system is f, it is preferable that the imaging lens satisfies Conditional Expression (1). f is a value in a state where the infinite distance object is in focus. By not allowing the corresponding value of Conditional Expression (1) to be equal to or less than the lower limit thereof, a wide angle of view can be ensured, and thus it is easy to prevent the subject from deviating from the imaging range. By not allowing the corresponding value of Conditional Expression (1) to be equal to or greater than the upper limit thereof, it is easy to capture an image of a subject in an enlarged manner. In order to obtain more favorable characteristics, it is more preferable that the imaging lens satisfies Conditional Expression (1-1), and it is yet more preferable that the imaging lens satisfies Conditional Expression (1-2).

$$0.1 < Ymax/f < 0.26 \tag{1}$$

$$0.12 < Ymax/f < 0.23 \tag{1-1}$$

$$0.15 < Ymax/f < 0.21 \tag{1-2}$$

Assuming that a focal length of the whole system is f, and a sum of a back focal length in terms of an air-equivalent distance and a distance on the optical axis Z from a lens surface closest to the object side in the first lens group G1 to a lens surface closest to the image side in the whole system is TL, it is preferable that the imaging lens satisfies Conditional Expression (2). f and TL are values in a state where the infinite distance object is in focus. By not allowing the corresponding value of Conditional Expression (2) to be equal to or less than the lower limit thereof, the convergence of the luminous flux can be made gentle toward the image plane Sim from the lens surface closest to the object side in the first lens group G1. As a result, there is an advantage in suppressing spherical aberration. By not allowing the corresponding value of Conditional Expression (2) to be equal to or greater than the upper limit thereof, there is an advantage in achieving reduction in size of the optical system. In order to obtain more favorable characteristics, it is more preferable that the imaging lens satisfies Conditional Expression (2-1), and it is yet more preferable that the imaging lens satisfies Conditional Expression (2-2).

$$0.4 < TL/f < 1.1 \tag{2}$$

$$0.43 < TL/f < 0.92 \tag{2-1}$$

$$0.5 < TL/f < 0.85 \tag{2-2}$$

Assuming that an amount of distortion at an image height, which is 50% of the maximum image height, is Dst5, and an amount of distortion at the maximum image height is Dst10, it is preferable that the imaging lens satisfies Conditional Expression (3). Dst5 and Dst10 are values in a state where the infinite distance object is in focus, on the basis of the d line. By not allowing the corresponding value of Conditional Expression (3) to be equal to or less than the lower limit thereof, the height of the off-axis luminous flux passing through the lens surface closest to the object side in the first lens group G1 can be suppressed. As a result, there is an advantage in achieving reduction in size. By not allowing the corresponding value of Conditional Expression (3) to be equal to or greater than the upper limit thereof, distortion in a region of the imaging region from the vicinity of the optical axis Z to the intermediate angle of view can be suppressed. As a result, there is an advantage in achieving an increase in resolution in this region. For example, this configuration is effective in a case of creating an image from which a peripheral portion of an imaging region is excluded and which includes only a region having an angle of view narrower than the maximum angle of view of the imaging lens, that is, a trimmed image to be described later. In order to obtain more favorable characteristics, it is more preferable that the imaging lens satisfies Conditional Expression (3-1), and it is yet more preferable that the imaging lens satisfies Conditional Expression (3-2).

$$0.2 < |Dst5/Dst10| < 0.6 \tag{3}$$

$$0.22 < |Dst5/Dst10| < 0.5 \tag{3-1}$$

$$0.25 < |Dst5/Dst10| < 0.4 \tag{3-2}$$

Assuming that a distance on the optical axis Z from the image plane Sim to an exit pupil position is Pe and a maximum image height is Ymax, it is preferable that the imaging lens satisfies Conditional Expression (4). Pe is a value in a state where the infinite distance object is in focus. Further, a sign of Pe is positive in a case where the exit pupil position is closer to the object side than the image plane Sim, and is negative in a case where the exit pupil position is closer to the image side than the image plane Sim. By not allowing the corresponding value of Conditional Expression (4) to be less than or equal to the lower limit thereof, it is possible to suppress an increase in incidence angle of the principal ray of the off-axis luminous flux on the image plane Sim. As a result, it is possible to reduce the effect of the incidence angle characteristic of the imaging element disposed in the image plane Sim in the imaging apparatus. By not allowing the corresponding value of Conditional Expression (4) to be equal to or greater than the upper limit thereof, it is easy to reduce the maximum diameter in the imaging lens. As a result, there is an advantage in achieving reduction in size. In order to obtain more favorable characteristics, it is more preferable that the imaging lens satisfies Conditional Expression (4-1), and it is yet more preferable that the imaging lens satisfies Conditional Expression (4-2).

$$1.5 < Pe/Ymax < 3 \tag{4}$$

$$1.6 < Pe/Ymax < 2.9 \tag{4-1}$$

$$1.8 < Pe/Ymax < 2.7 \tag{4-2}$$

It is preferable that the imaging lens includes a negative lens at a position closest to the image side in the whole system. Further, assuming that a curvature radius of an object side surface of the negative lens is Rf, and a curvature radius of an image side surface of the negative lens is Rr, it is preferable that the imaging lens satisfies Conditional Expression (5). By not allowing the corresponding value of Conditional Expression (5) to be equal to or less than the lower limit thereof, the refractive light of the on-axis luminous flux in the negative lens closest to the image side can be strongly refracted. As a result, there is an advantage in correcting spherical aberration. By not allowing the corresponding value of Conditional Expression (5) to be equal to or greater than the upper limit thereof, the refractive effect of the negative lens closest to the image side on the off-axis luminous flux can be strengthened. As a result, there is an advantage in correcting field curvature. In order to obtain more favorable characteristics, it is more preferable that the imaging lens satisfies Conditional Expression (5-1), and it is yet more preferable that the imaging lens satisfies Conditional Expression (5-2).

$$-0.6 < (Rf-Rr)/(Rf+Rr) < -0.1 \tag{5}$$

$$-0.58 < (Rf-Rr)/(Rf+Rr) < -0.17 \tag{5-1}$$

$$-0.55 < (Rf-Rr)/(Rf+Rr) < -0.25 \tag{5-2}$$

In a case where the imaging lens includes a negative lens at the position closest to the image side in the whole system, it is preferable that the imaging lens includes a positive lens subsequent to the negative lens on the object side of the negative lens. Assuming that a curvature radius of the object side surface of the negative lens is Rf and a curvature radius of an image side surface of the positive lens is Rpr, it is preferable that the imaging lens satisfies Conditional Expression (6). By not allowing the corresponding value of Conditional Expression (6) to be equal to or less than the lower limit thereof, the refractive light of the on-axis luminous flux is increased between the negative lens and the positive lens. As a result, there is an advantage in correcting longitudinal chromatic aberration. By not allowing the corresponding value of Conditional Expression (6) to be equal to or greater than the upper limit thereof, the refractive light of the off-axis luminous flux is increased between the negative lens and the positive lens. As a result, there is an advantage in correcting lateral chromatic aberration. In order to obtain more favorable characteristics, it is more preferable that the imaging lens satisfies Conditional Expression (6-1), and it is yet more preferable that the imaging lens satisfies Conditional Expression (6-2).

$$0.03 < (Rpr-Rf)/(Rpr+Rf) < 0.4 \tag{6}$$

$$0.04 < (Rpr-Rf)/(Rpr+Rf) < 0.32 \tag{6-1}$$

$$0.07 < (Rpr-Rf)/(Rpr+Rf) < 0.27 \tag{6-2}$$

In a case where the imaging lens includes a negative lens at the position closest to the image side in the whole system, assuming that an Abbe number of the negative lens based on the d line is vn, it is preferable that the imaging lens satisfies Conditional Expression (7). By not allowing the corresponding value of Conditional Expression (7) to be equal to or less than the lower limit thereof, it is possible to suppress excessive correction of lateral chromatic aberration. By not allowing the corresponding value of Conditional Expression (7) to be equal to or greater than the upper limit thereof, there is an advantage in satisfactorily correcting lateral chromatic aberration. In order to obtain more favorable characteristics, it is more preferable that the imaging lens satisfies Conditional Expression (7-1), and it is yet more preferable that the imaging lens satisfies Conditional Expression (7-2).

$$12 < vn < 30 \tag{7}$$

$$14 < vn < 25 \tag{7-1}$$

$$17 < vn < 20 \tag{7-2}$$

Assuming that a distance on the optical axis Z from the lens surface closest to the object side in the first lens group G1 to the lens surface closest to the image side in the first lens group G1 is DG1 and a focal length of the whole system is f, it is preferable that the imaging lens satisfies Conditional Expression (8). For example, DG1 is shown in FIG. 1. f is a value in a state where the infinite distance object is in focus. By not allowing the corresponding value of Conditional Expression (8) to be equal to or less than the lower limit thereof, it is easy to satisfactorily correct longitudinal chromatic aberration which occurs in the first lens group G1. By not allowing the corresponding value of Conditional Expression (8) to be equal to or greater than the upper limit thereof, it is easy to achieve reduction in size of the first lens group G1. As a result, there is an advantage in achieving reduction in weight. In order to obtain more favorable characteristics, it is more preferable that the imaging lens satisfies Conditional Expression (8-1), and it is yet more preferable that the imaging lens satisfies Conditional Expression (8-2).

$$0.02 < DG1/f < 0.2 \tag{8}$$

$$0.04 < DG1/f < 0.18 \tag{8-1}$$

$$0.07 < DG1/f < 0.15 \tag{8-2}$$

Assuming that a maximum half angle of view is ω, and an angle between an axis Zp parallel to the optical axis Z and a principal ray with the maximum image height toward the image plane Sim from a lens closest to the image side is ωi, it is preferable that the imaging lens satisfies Conditional Expression (9). The tan is a tangent. ω and ωi are values in a state where the infinite distance object is in focus. Further, ωi is a value in the air. For example, FIG. 1 shows ω, ωi, and Zp. ω is an angle between the optical axis Z and the principal ray with the maximum image height, and is a half value of the maximum angle of view 2ω. By not allowing the corresponding value of Conditional Expression (9) to be equal to or less than the lower limit thereof, there is an advantage in the configuration of the lens system having an angle of view more suitable for the telephoto system. By not allowing the corresponding value of Conditional Expression (9) to be equal to or greater than the upper limit thereof, it is easy to reduce the maximum diameter in the imaging lens. As a result, there is an advantage in achieving reduction in size. In order to obtain more favorable characteristics, it is more preferable that the imaging lens satisfies Conditional Expression (9-1), and it is yet more preferable that the imaging lens satisfies Conditional Expression (9-2).

$$1.4 < \tan \omega i / \tan \omega < 3.6 \tag{9}$$

$$1.5 < \tan \omega i / \tan \omega < 3.3 \tag{9-1}$$

$$1.8 < \tan \omega i / \tan \omega < 2.9 \tag{9-2}$$

Assuming that a maximum effective diameter of the lens surface closest to the object side in the first lens group G1 is φf and a maximum effective diameter of the lens surface closest to the image side in the whole system is φr, it is preferable that the imaging lens satisfies Conditional Expression (10). By not allowing the corresponding value of Conditional Expression (10) to be equal to or less than the lower limit thereof, the incident range of the ray incident on the imaging lens can be widened. As a result, there is an advantage in decreasing the F number or increasing the amount of peripheral light. By not allowing the corresponding value of Conditional Expression (10) to be equal to or greater than the upper limit thereof, the weight of the first lens group G1 can be reduced. As a result, the centroid of gravity of the imaging lens can be brought closer to the image side. In order to obtain more favorable characteristics, it is more preferable that the imaging lens satisfies Conditional Expression (10-1), and it is yet more preferable that the imaging lens satisfies Conditional Expression (10-2).

$$0.2 < \varphi f / \varphi r < 1.5 \tag{10}$$

$$0.3 < \varphi f / \varphi r < 1.4 \tag{10-1}$$

$$0.6 < \varphi f / \varphi r < 1.13 \tag{10-2}$$

In the technique of the present disclosure, twice the distance to the optical axis Z from the intersection between the lens surface and the ray passing through the outermost side among rays incident onto the lens surface from the object side and emitted to the image side is the "maximum effective diameter" of the lens surface. The "outer side" here is the radial outside centered on the optical axis Z, that is, the side separated from the optical axis Z. Further, the "ray passing through the outermost side" is determined in consideration of all the object distances that can be focused.

Assuming that a back focal length of the whole system in terms of air-equivalent distance is Bf and a maximum image height is Ymax, it is preferable that the imaging lens satisfies Conditional Expression (11). Bf is a value in a state where the infinite distance object is in focus. By not allowing the corresponding value of Conditional Expression (11) to be equal to or less than the lower limit thereof, the height of the off-axis ray passing through the lens at the position closest to the image side in the whole system can be suppressed. As a result, it is possible to reduce the diameter of this lens. There is an advantage in reduction in weight. By not allowing the corresponding value of Conditional Expression (11) to be equal to or greater than the upper limit thereof, there is an advantage in achieving reduction in total length. In order to obtain more favorable characteristics, it is more preferable that the imaging lens satisfies Conditional Expression (11-1), and it is yet more preferable that the imaging lens satisfies Conditional Expression (11-2).

$$0.4 < Bf/Ymax < 1.8 \tag{11}$$

$$0.5 < Bf/Ymax < 1.7 \tag{11-1}$$

$$0.8 < Bf/Ymax < 1.4 \tag{11-2}$$

Assuming that a focal length of the first lens group G1 is f1 and the focal length of the whole system is f, it is preferable that the imaging lens satisfies Conditional Expression (12). f is a value in a state where the infinite distance object is in focus. By not allowing the corresponding value of Conditional Expression (12) to be equal to or less than the lower limit thereof, there is an advantage in correcting spherical aberration which occurs in the first lens group G1. By not allowing the corresponding value of Conditional Expression (12) to be equal to or greater than the upper limit thereof, there is an advantage in achieving reduction in total length. In order to obtain more favorable characteristics, it is more preferable that the imaging lens satisfies Conditional Expression (12-1), and it is yet more preferable that the imaging lens satisfies Conditional Expression (12-2).

$$0.25 < f1/f < 0.5 \tag{12}$$

$$0.27 < f1/f < 0.48 \tag{12-1}$$

$$0.3 < f1/f < 0.45 \tag{12-2}$$

It is preferable that the imaging lens consists of, in order from the object side to the image side, the first lens group G1, the focus lens group Gf that has a negative refractive power as a whole, and a rear lens group GR that remains stationary with respect to the image plane Sim during focusing. In such a case, it is preferable that the imaging lens satisfies Conditional Expression (13). Here, it is assumed that a focal length of the rear lens group GR is fR and a focal length of the whole system in a state where the infinite distance object is in focus is f. By not allowing the corresponding value of Conditional Expression (13) to be equal to or less than the lower limit thereof, the negative refractive power of the rear lens group GR can be ensured. Therefore, the negative refractive power of the focus lens group Gf is prevented from becoming excessively strong. Thereby, there is an advantage in suppressing fluctuation in aberrations during focusing. By not allowing the corresponding value of Conditional Expression (13) to be equal to or greater than the upper limit thereof, the negative refractive power of the rear lens group GR can be suppressed. Therefore, the negative refractive power of the focus lens group Gf can be increased. Thereby, there is an advantage in suppressing the amount of movement of the focus lens group Gf during focusing. In order to obtain more favorable characteristics, it is more preferable that the imaging lens satisfies Conditional Expression (13-1), and it is yet more preferable that the imaging lens satisfies Conditional Expression (13-2).

$$-0.9 < fR/f < -0.1 \tag{13}$$

$$-0.8 < fR/f < -0.15 \tag{13-1}$$

$$-0.4 < fR/f < -0.18 \tag{13-2}$$

It is preferable that the imaging lens includes a vibration-proof group that corrects image blurring by moving in a direction intersecting with the optical axis Z. In such a case, correction of image blurring due to camera shake, vibration, or the like can be performed, and a favorable image can be obtained. As will be described later, in an imaging apparatus, in a case of creating a high-resolution image, an imaging element may be moved in order to obtain a plurality of images. Therefore, moving of the lens may be better than moving of the imaging element in order to correct image blurring.

For example, the vibration-proof group of FIG. 1 consists of a cemented lens in which a lens L31 and a lens L32 are cemented. The vertical double arrows below the lens L31 and the lens L32 in FIG. 1 indicate that the lenses are in the vibration-proof group.

It is preferable that the vibration-proof group has a negative refractive power as a whole. In such a case, there is an advantage in suppressing fluctuation in chromatic aberration during correction of image blurring.

The number of lenses included in the vibration-proof group is preferably equal to or less than two. In such a case, there is an advantage in achieving reduction in weight of the vibration-proof group.

It is preferable that the vibration-proof group is disposed closer to the image side than the focus lens group Gf. In such a case, there is an advantage in suppressing fluctuation in aberrations relating to the on-axis ray during correction of image blurring. The vibration-proof group may be disposed closest to the object side in the rear lens group GR.

In such a case, there is an advantage in achieving reduction in size and weight of the vibration-proof group.

In a case where one lens component is a group of cemented lenses or one single lens, the vibration-proof group may be configured to consist of one lens component. In such a case, there is an advantage in achieving reduction in size and weight of the vibration-proof group. In a case where the vibration-proof group consists of a cemented lens in which a positive lens and a negative lens are cemented, there is an advantage in suppressing fluctuation in chromatic aberration during correction of image blurring. In a case where the vibration-proof group consists of one single lens, there is an advantage in achieving reduction in size and weight.

Assuming that a focal length of the vibration-proof group is fv and a focal length of the whole system is f, it is preferable that the imaging lens satisfies Conditional Expression (14). f is a value in a state where the infinite distance object is in focus. By not allowing the corresponding value of Conditional Expression (14) to be equal to or less than the lower limit thereof, the refractive power of the vibration-proof group can be increased. Therefore, a high vibration-proof effect can be obtained with a small amount of movement. By not allowing the corresponding value of Conditional Expression (14) to be equal to or greater than the upper limit thereof, the refractive power of the vibration-proof group is prevented from becoming excessively strong. As a result, there is an advantage in suppressing fluctuation in aberrations during correction of image blurring. In order to obtain more favorable characteristics, it is more preferable that the imaging lens satisfies Conditional Expression (14-1), and it is yet more preferable that the imaging lens satisfies Conditional Expression (14-2).

$$-0.35 < fv/f < -0.1 \tag{14}$$

$$-0.33 < fv/f < -0.12 \tag{14-1}$$

$$-0.3 < fv/f < -0.15 \tag{14-2}$$

The example shown in FIG. 1 is an example of the imaging lens of the present disclosure. The number of lenses constituting each group of the imaging lenses of the present disclosure can be different from the number shown in the example shown in FIG. 1. The terms "first lens group", the "focus lens group", the "rear lens group", and the "vibration-proof group" are not limited to a configuration consisting of a plurality of lenses, but may be a configuration consisting of only one lens.

The above-mentioned preferred configurations and available configurations including the configurations relating to Conditional Expressions may be any combination, and it is preferable to appropriately and selectively adopt the configurations in accordance with required specification. It should be noted that Conditional Expressions that the imaging lens of the present disclosure preferably satisfies are not limited to Conditional Expressions described in the form of Expression, and the lower limit and the upper limit are selected from the preferable, more preferable, and yet more preferable conditional expressions. Conditional Expressions may include all conditional expressions obtained through optional combinations.

For example, according to a preferred aspect of the present disclosure, the imaging lens includes, successively in order from the position closest to the object side to the image side, a first lens group G1 that remains stationary with respect to the image plane Sim during focusing, and a focus lens group Gf that moves along the optical axis Z during focusing, and the imaging lens satisfies Conditional Expressions (1) and (2).

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

Figure 2:
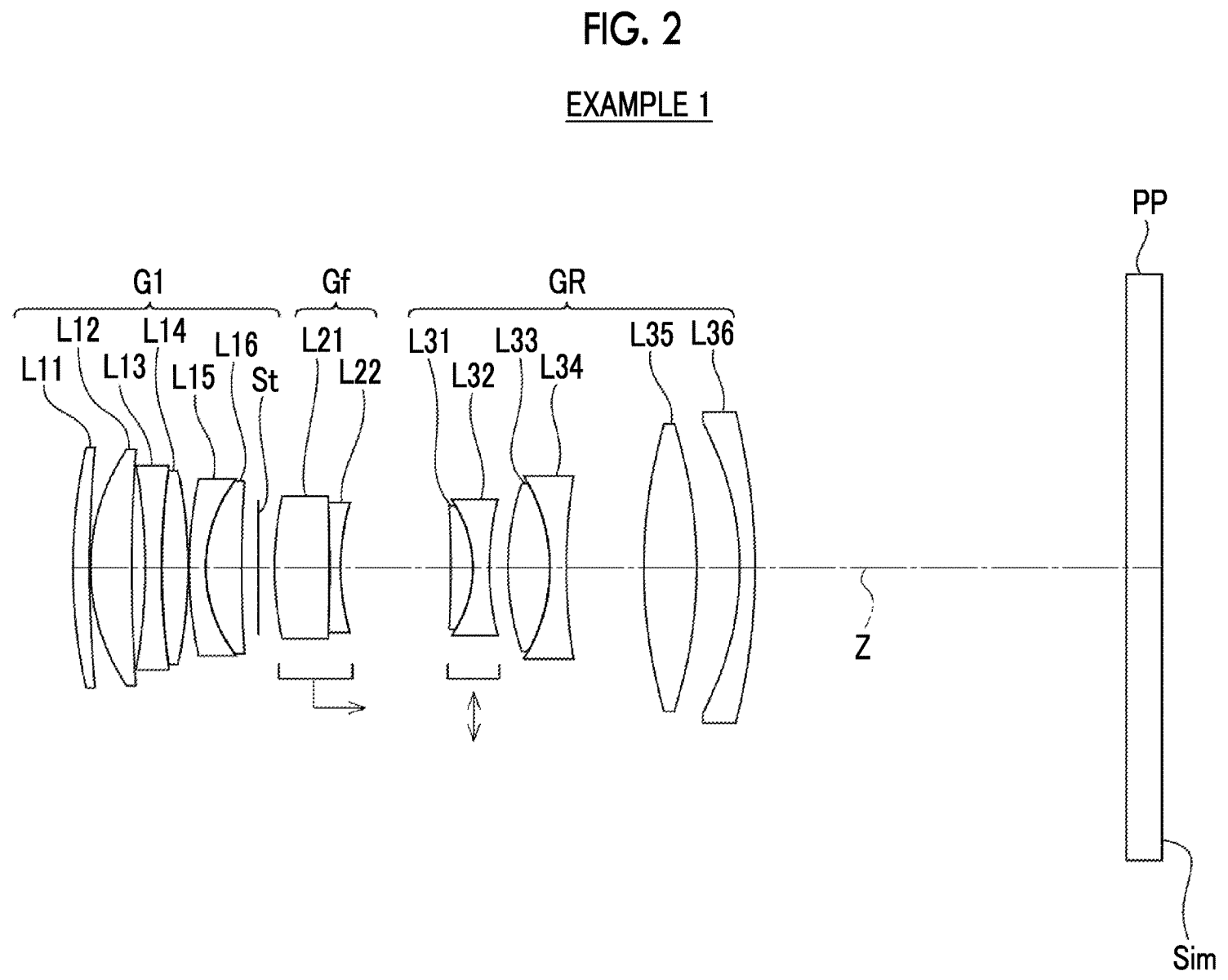

FIG. 2 is a cross-sectional view of a configuration of the imaging lens of Example 1. The imaging lens of Example 1 consists of, in order from the object side to the image side, a first lens group G1, a focus lens group Gf, and a rear lens group GR. During focusing from the infinite distance object to the close range object, the entire focus lens group Gf is integrally moved to the image side, and the first lens group G1 and the rear lens group GR remain stationary with respect to the image plane Sim.

The first lens group G1 consists of six lenses L11 to L16 and an aperture stop St, in order from the object side to the image side. The focus lens group Gf consists of two lenses L21 and L22, in order from the object side to the image side. The rear lens group GR consists of six lenses L31 to L36, in order from the object side to the image side. The vibration-proof group consists of a lens L31 and a lens L32. It should be noted that the aperture stop St of FIG. 2 does not indicate the size and shape, but indicates the position in the direction of the optical axis Z.

Regarding the imaging lens of Example 1, Table 1 shows basic lens data, Table 2 shows specification, and Table 3 shows variable surface spacings thereof. In Example 1, a light blocking member (not shown in the drawing) having a circular opening portion centered on a point on the optical axis Z is disposed at a predetermined position to restrict a height of ray that can pass through the light blocking member.

Table 1 is noted as follows. The column of Sn shows surface numbers in a case where the surface closest to the object side is the first surface and the number is increased one by one toward the image side. The R column shows a curvature radius of each surface. The column of D shows a surface spacing between each surface and the surface adjacent to the image side on the optical axis Z. The Nd column shows a refractive index of each constituent element at the d line. The vd column shows an Abbe number of each constituent element based on the d line. The VigD column shows a diameter of the opening portion in a row of a surface on which the light blocking member is disposed.

In Table 1, the sign of the curvature radius of the convex surface facing toward the object side is positive and the sign of the curvature radius of the convex surface facing toward the image side is negative. Table 1 also shows the aperture stop St and the optical member PP. In a cell of a surface number of a surface corresponding to the aperture stop St, the surface number and a term of (St) are noted. A value at the bottom cell of D in Table 1 indicates a spacing between the image plane Sim and the surface closest to the image side in the table. In Table 1, each variable surface spacing during focusing uses the symbol DD[ ], and the object side surface number of the spacing is given in[ ] and is noted in the column of D.

Table 2 shows the focal length f of the whole system, the F number FNo., the maximum angle of view 2ω, and the maximum image height Ymax. (°) in the cell of 2ω indicates that the unit thereof is a degree. Table 2 shows values in a state where the infinite distance object is in focus.

In Table 3, the "infinity" column shows values of the variable surface spacing in a state where the infinite distance object is in focus, and the "1.5 m" column shows values of the variable surface spacing in a state where an object at an object distance of 1.5 meters (m) is in focus. Tables 1, 2 and 3 show values in a case where the d line is set as a reference.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

| | | Example 1 | | | |
|---|---|---|---|---|---|
| Sn | R | D | Nd | vd | VigD |
| 1 | 53.8153 | 1.5078 | 1.91082 | 35.25 | |
| 2 | 125.3214 | 0.1001 | | | |
| 3 | 20.1525 | 3.7877 | 1.49700 | 81.54 | |
| 4 | 162.8269 | 1.2378 | | | |
| 5 | −54.5472 | 1.5003 | 1.69680 | 56.20 | |
| 6 | 68.0984 | 2.4123 | 1.53172 | 48.85 | |
| 7 | −43.3719 | 0.1002 | | | 16 |
| 8 | 40.6255 | 1.5002 | 1.91082 | 35.25 | |
| 9 | 13.3958 | 3.2905 | 1.49700 | 81.54 | |
| 10 | 133.8260 | 1.5005 | | | |
| 11(St) | ∞ | DD[11] | | | |
| 12 | 31.9091 | 5.0080 | 1.61720 | 53.93 | |
| 13 | −153.7992 | 0.9999 | 1.65950 | 57.38 | |
| 14 | 20.5896 | DD[14] | | | 11 |
| 15 | −93.2866 | 2.0094 | 1.85026 | 32.30 | |
| 16 | −11.1108 | 1.5099 | 1.81600 | 46.55 | |
| 17 | 26.5955 | 1.6893 | | | |
| 18 | 24.7869 | 3.8230 | 1.57501 | 41.51 | |
| 19 | −16.2460 | 1.5000 | 1.69680 | 56.20 | |
| 20 | 53.7465 | 7.0453 | | | |
| 21 | 49.2110 | 4.8109 | 1.63980 | 34.47 | |
| 22 | −45.0978 | 3.9381 | | | |
| 23 | −28.7098 | 1.4003 | 1.94595 | 17.98 | |
| 24 | −60.3284 | 33.9881 | | | |
| 25 | ∞ | 3.2000 | 1.51680 | 64.20 | |
| 26 | ∞ | 0.0000 | | | |

TABLE 2

| Example 1 | |
|---|---|
| f | 145.65 |
| FNo. | 8.26 |
| 2ω(°) | 20.8 |
| Ymax | 27.35 |

TABLE 3

| Example 1 | | |
|---|---|---|
| | Infinity | 1.5 m |
| DD[11] | 1.5000 | 6.2666 |
| DD[14] | 10.1295 | 5.3629 |

Figure 3:
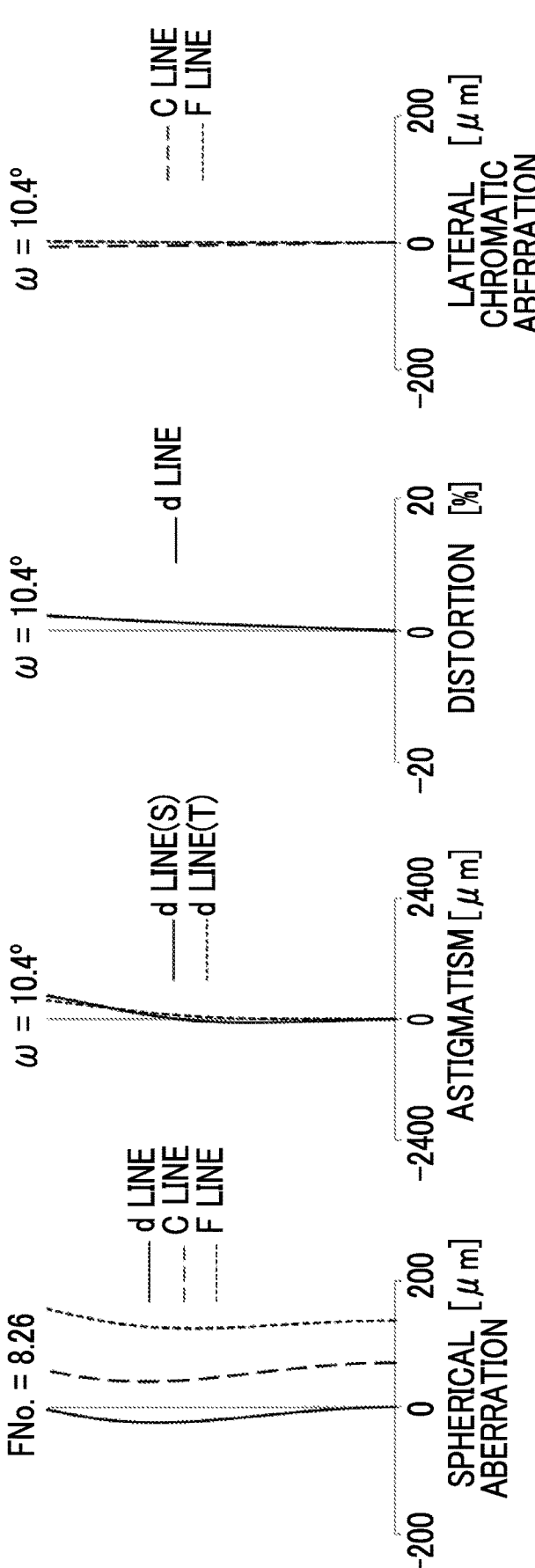
FIG. 3 is a diagram showing aberrations of the imaging lens of Example 1.

FIG. 3 shoes aberration diagrams of the imaging lens of Example 1 in a state where the infinite distance object is in focus. FIG. 3 shows spherical aberration, astigmatism, distortion, and lateral chromatic aberration, in order from the left side. In the spherical aberration diagram, aberrations at the d line, the C line, and the F line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In the distortion diagram, aberration at the d line is indicated by a solid line. In the lateral chromatic aberration diagram, aberrations at the C line, and the F line are respectively indicated by the long broken line, and the short broken line. In the spherical aberration diagram, a value of the F number is shown after "FNo.=". In other aberration diagrams, a value of the maximum half angle of view is shown after "ω=".

Symbols, meanings, description methods, and illustration methods of the respective data pieces according to Example 1 are the same as those in the following examples unless otherwise specified. Therefore, in the following description, repeated description will not be given.

Example 2

Figure 4:
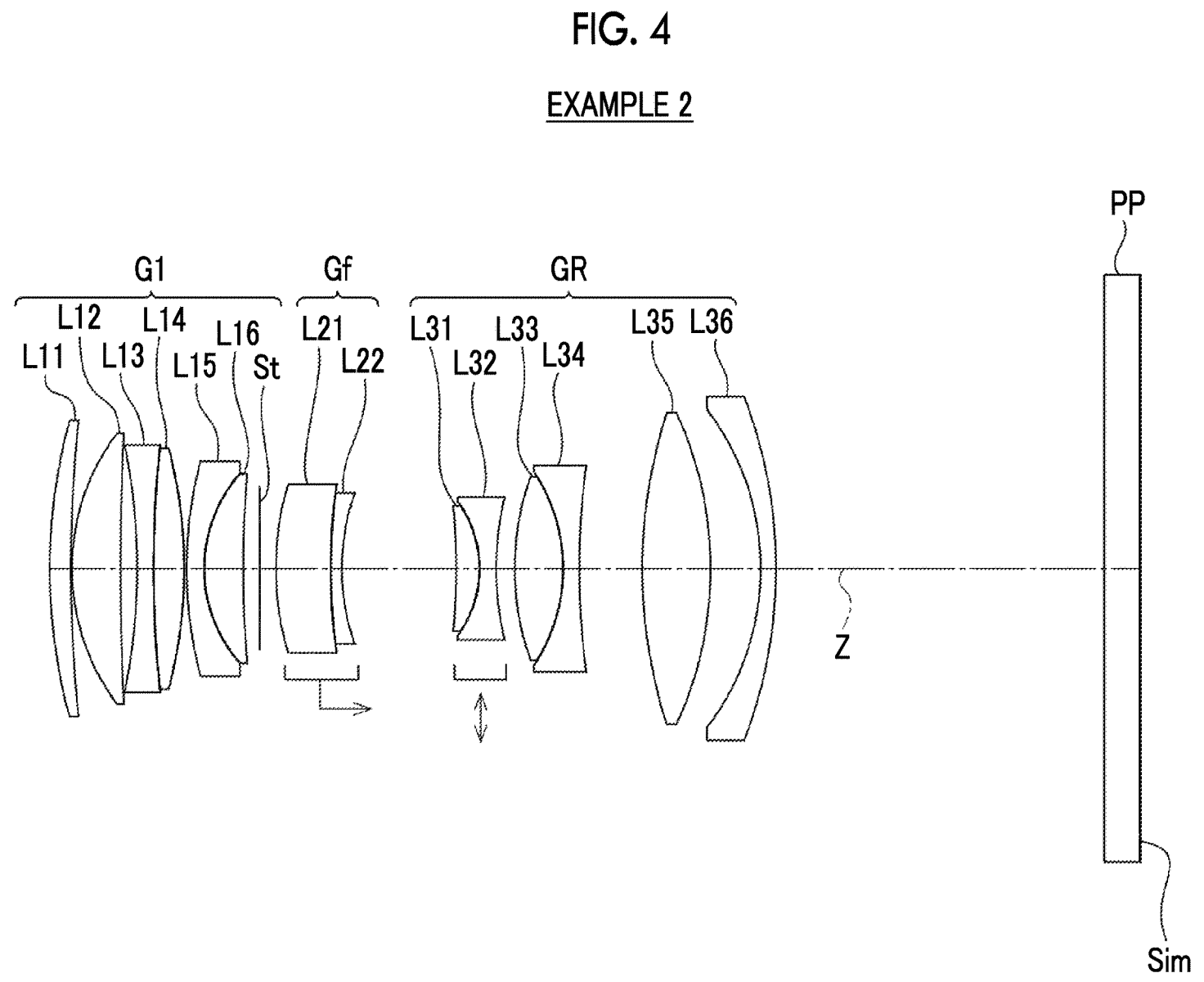

FIG. 4 is a cross-sectional view of a configuration of an imaging lens of Example 2. The imaging lens of Example 2 consists of, in order from the object side to the image side, a first lens group G1, a focus lens group Gf, and a rear lens group GR. During focusing from the infinite distance object to the close range object, the entire focus lens group Gf is integrally moved to the image side, and the first lens group G1 and the rear lens group GR remain stationary with respect to the image plane Sim.

The first lens group G1 consists of six lenses L11 to L16 and an aperture stop St, in order from the object side to the image side. The focus lens group Gf consists of two lenses L21 and L22, in order from the object side to the image side. The rear lens group GR consists of six lenses L31 to L36, in order from the object side to the image side. The vibration-proof group consists of a lens L31 and a lens L32.

Figure 5:
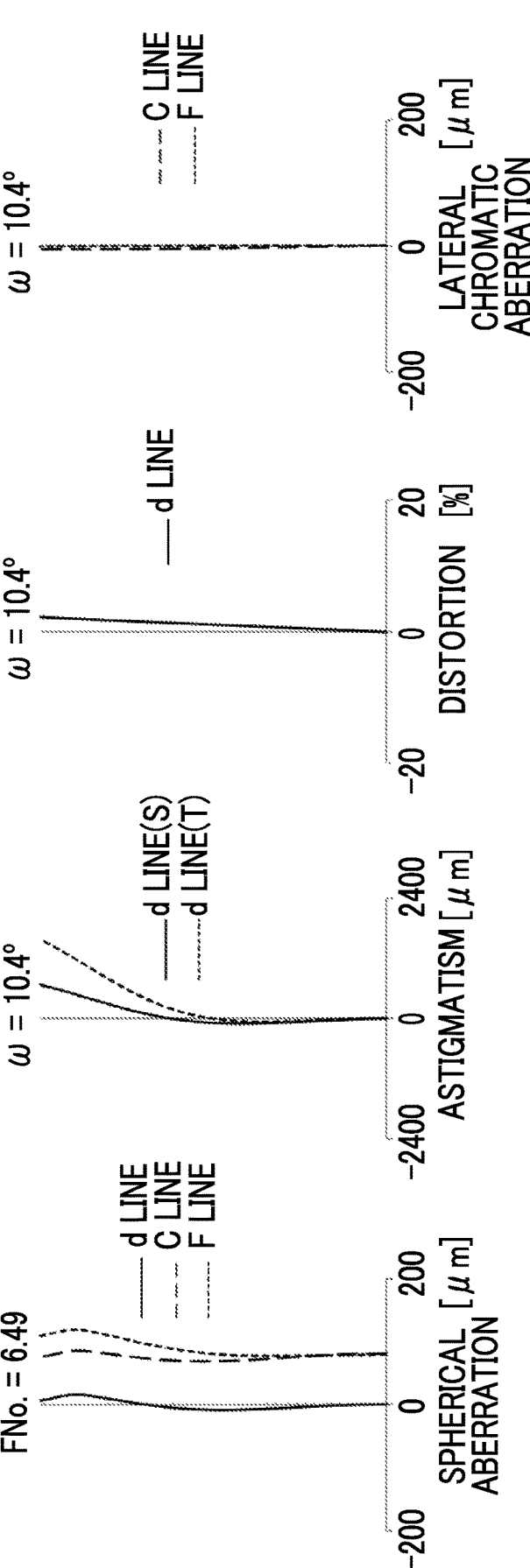
FIG. 5 is a diagram showing aberrations of the imaging lens of Example 2.

Regarding the imaging lens of Example 2, Table 4 shows the basic lens data, Table 5 shows the specifications, Table 6 shows the variable surface spacings, and FIG. 5 shows aberration diagrams in a state where the infinite distance object is in focus.

TABLE 4

| | Example 2 | | | | |
|---|---|---|---|---|---|
| Sn | R | D | Nd | vd | VigD |
| 1 | 53.1777 | 1.9202 | 1.91082 | 35.25 | |
| 2 | 133.4793 | 0.1000 | | | |
| 3 | 21.3758 | 4.4970 | 1.49700 | 81.54 | |
| 4 | 277.0688 | 1.4950 | | | |
| 5 | −58.9789 | 1.4996 | 1.81600 | 46.55 | |
| 6 | 107.5133 | 2.7786 | 1.56732 | 42.82 | |
| 7 | −45.3891 | 0.2471 | | | 20.4 |
| 8 | 40.7613 | 1.5916 | 1.91082 | 35.25 | |
| 9 | 13.5126 | 3.5340 | 1.49700 | 81.54 | |
| 10 | 99.6724 | 1.4999 | | | |
| 11(St) | ∞ | DD[11] | | | |
| 12 | 27.5796 | 5.0088 | 1.58144 | 40.75 | |
| 13 | 58.1176 | 1.0001 | 1.81600 | 46.55 | |
| 14 | 20.3966 | DD[14] | | | 10 |
| 15 | −60.9164 | 2.1212 | 1.85026 | 32.30 | |
| 16 | −10.5918 | 1.5102 | 1.81600 | 46.55 | |
| 17 | 27.5619 | 1.7036 | | | |
| 18 | 26.0103 | 4.3893 | 1.58144 | 40.91 | |
| 19 | −16.5982 | 1.5003 | 1.72916 | 54.67 | |
| 20 | 69.6320 | 5.7090 | | | |
| 21 | 48.3476 | 6.2074 | 1.62589 | 35.71 | |
| 22 | −35.3985 | 4.5714 | | | |
| 23 | −24.7743 | 1.4004 | 1.94595 | 17.98 | |
| 24 | −45.5303 | 30.0388 | | | |
| 25 | ∞ | 3.2000 | 1.51680 | 64.20 | |
| 26 | ∞ | 0.0000 | | | |

TABLE 5

| Example 2 | |
|---|---|
| f | 145.65 |
| FNo. | 6.49 |
| 2ω(°) | 20.8 |
| Ymax | 27.35 |

TABLE 6

| Example 2 | | |
|---|---|---|
| | Infinity | 1.5 m |
| DD[11] | 1.5002 | 6.2822 |
| DD[14] | 10.4823 | 5.7003 |

Example 3

Figure 6:
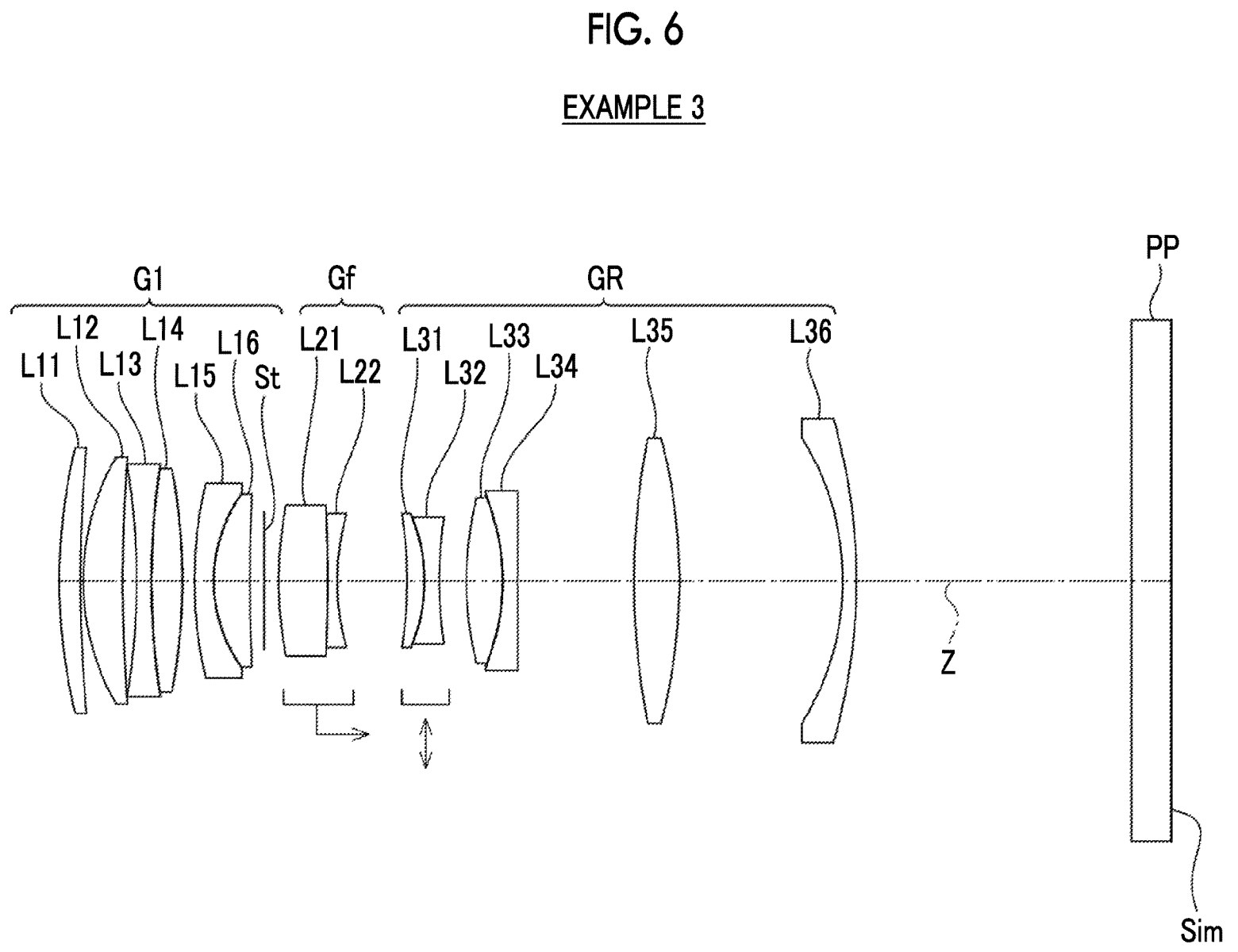

FIG. 6 is a cross-sectional view of a configuration of an imaging lens of Example 3. The imaging lens of Example 3 consists of, in order from the object side to the image side, a first lens group G1, a focus lens group Gf, and a rear lens group GR. During focusing from the infinite distance object to the close range object, the entire focus lens group Gf is integrally moved to the image side, and the first lens group G1 and the rear lens group GR remain stationary with respect to the image plane Sim.

The first lens group G1 consists of six lenses L11 to L16 and an aperture stop St, in order from the object side to the image side. The focus lens group Gf consists of two lenses L21 and L22, in order from the object side to the image side. The rear lens group GR consists of six lenses L31 to L36, in order from the object side to the image side. The vibration-proof group consists of a lens L31 and a lens L32.

Figure 7:
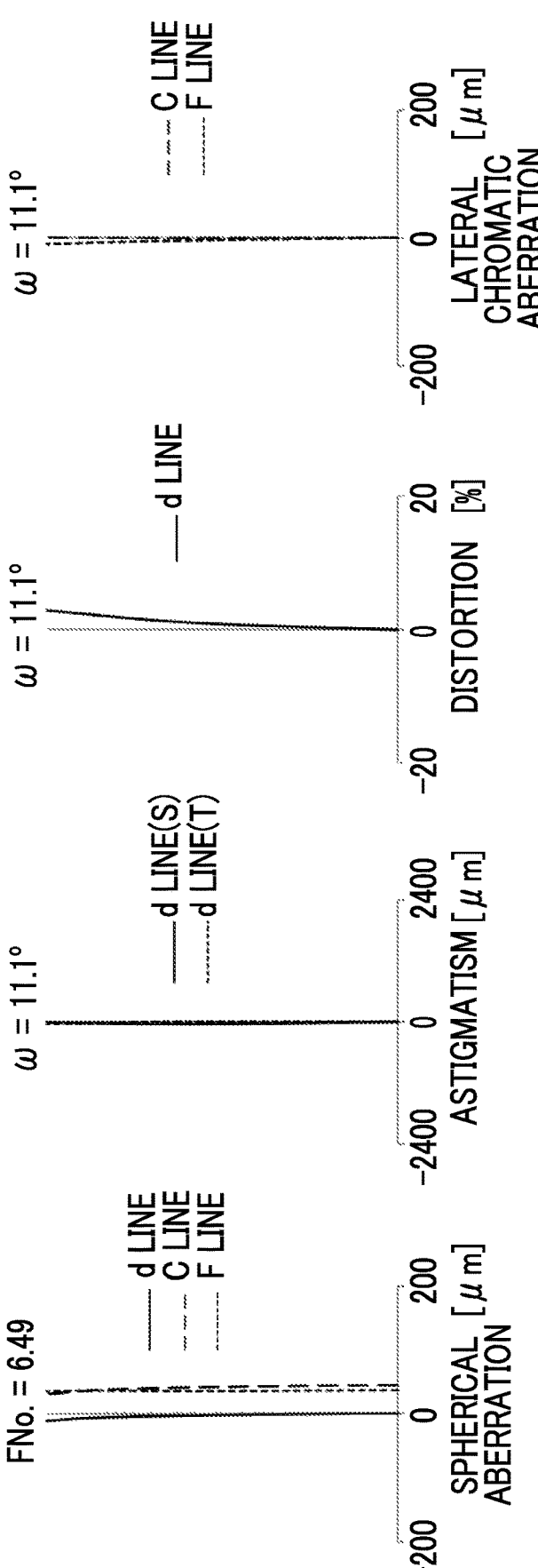
FIG. 7 is a diagram showing aberrations of the imaging lens of Example 3.

Regarding the imaging lens of Example 3, Table 7 shows the basic lens data, Table 8 shows the specifications, Table 9 shows the variable surface spacings, and FIG. 7 shows aberration diagrams in a state where the infinite distance object is in focus.

TABLE 7

| | | Example 3 | | | |
|---|---|---|---|---|---|
| Sn | R | D | Nd | vd | VigD |
| 1 | 47.8459 | 1.6901 | 1.91082 | 35.25 | |
| 2 | 118.7353 | 0.2410 | | | |
| 3 | 20.8070 | 3.1975 | 1.49700 | 81.54 | |
| 4 | 143.8807 | 1.1299 | | | |
| 5 | −58.5372 | 1.1918 | 1.74400 | 44.90 | |
| 6 | 63.8317 | 2.5103 | 1.61772 | 49.81 | |
| 7 | −48.7631 | 0.9732 | | | 16.1 |
| 8 | 36.1443 | 1.5576 | 1.91082 | 35.25 | |
| 9 | 12.5191 | 2.9269 | 1.49700 | 81.54 | |
| 10 | 161.8530 | 1.1838 | | | |
| 11(St) | ∞ | DD[11] | | | |
| 12 | 32.6928 | 3.9614 | 1.58267 | 46.61 | |
| 13 | −145.3491 | 0.7893 | 1.72916 | 54.67 | |
| 14 | 21.1745 | DD[14] | | | 11 |
| 15 | −36.1318 | 1.4070 | 2.00330 | 28.32 | |
| 16 | −14.1613 | 1.1915 | 1.81600 | 46.55 | |
| 17 | 33.4598 | 2.1918 | | | |
| 18 | 27.9021 | 2.9994 | 1.57957 | 53.74 | |
| 19 | −18.1158 | 1.1837 | 1.71700 | 47.92 | |
| 20 | 2482.9150 | 9.3643 | | | |
| 21 | 62.7554 | 3.6648 | 1.77047 | 29.74 | |
| 22 | −47.5902 | 13.2688 | | | |
| 23 | −22.6381 | 1.1042 | 1.94595 | 17.98 | |
| 24 | −48.7260 | 22.3140 | | | |
| 25 | ∞ | 3.2000 | 1.51680 | 64.20 | |
| 26 | ∞ | 0.0000 | | | |

TABLE 8

| | Example 3 |
|---|---|
| f | 106.55 |
| FNo. | 6.49 |
| 2ω(°) | 22.2 |
| Ymax | 21.579 |

TABLE 9

| | Example 3 | |
|---|---|---|
| | Infinity | 1.2 m |
| DD[11] | 1.1838 | 4.5141 |
| DD[14] | 5.6462 | 2.3159 |

Example 4

Figure 8:
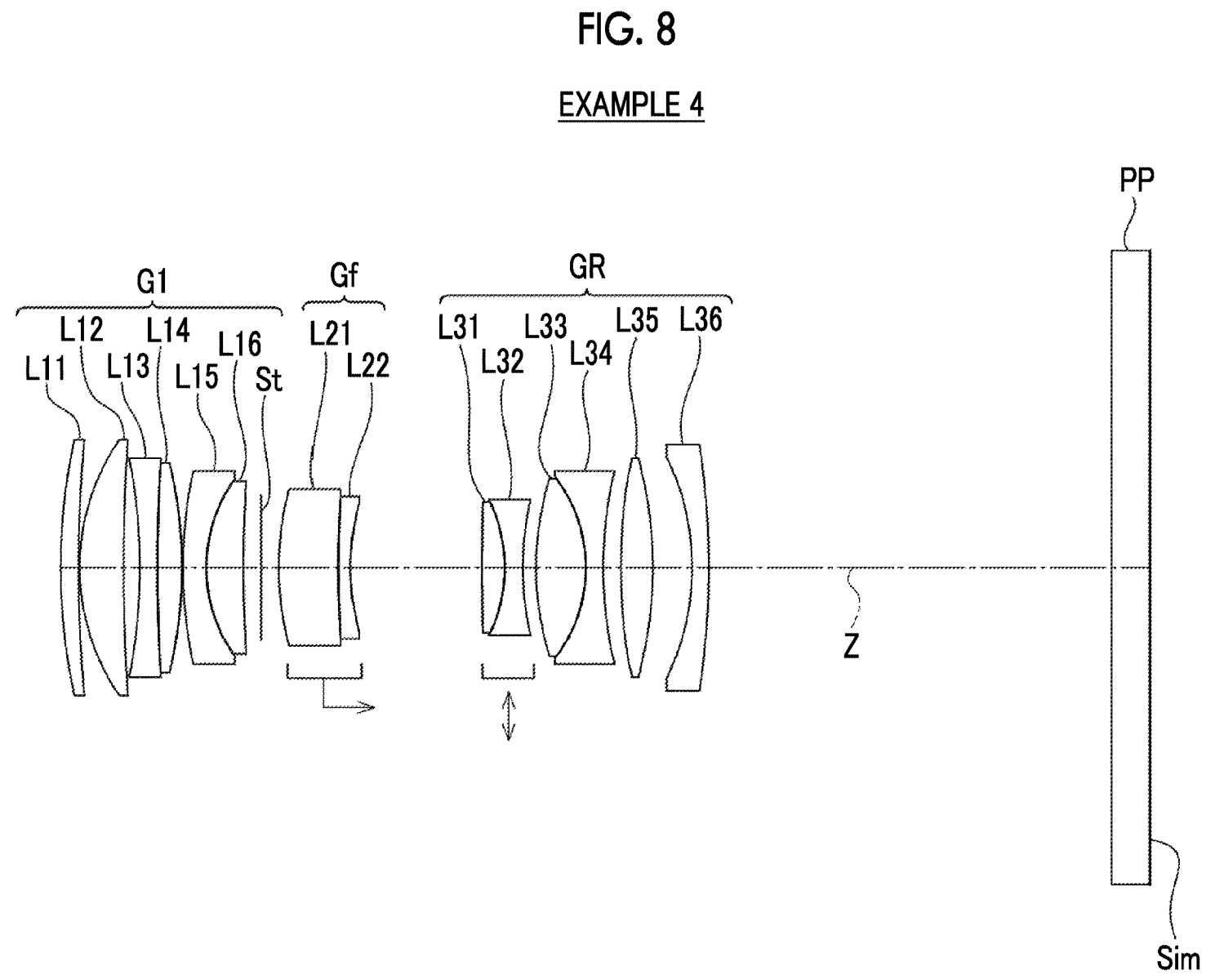

FIG. 8 is a cross-sectional view of a configuration of an imaging lens of Example 4. The imaging lens of Example 4 consists of, in order from the object side to the image side, a first lens group G1, a focus lens group Gf, and a rear lens group GR. During focusing from the infinite distance object to the close range object, the entire focus lens group Gf is integrally moved to the image side, and the first lens group G1 and the rear lens group GR remain stationary with respect to the image plane Sim.

The first lens group G1 consists of six lenses L11 to L16 and an aperture stop St, in order from the object side to the image side. The focus lens group Gf consists of two lenses L21 and L22, in order from the object side to the image side. The rear lens group GR consists of six lenses L31 to L36, in order from the object side to the image side. The vibration-proof group consists of a lens L31 and a lens L32.

Figure 9:
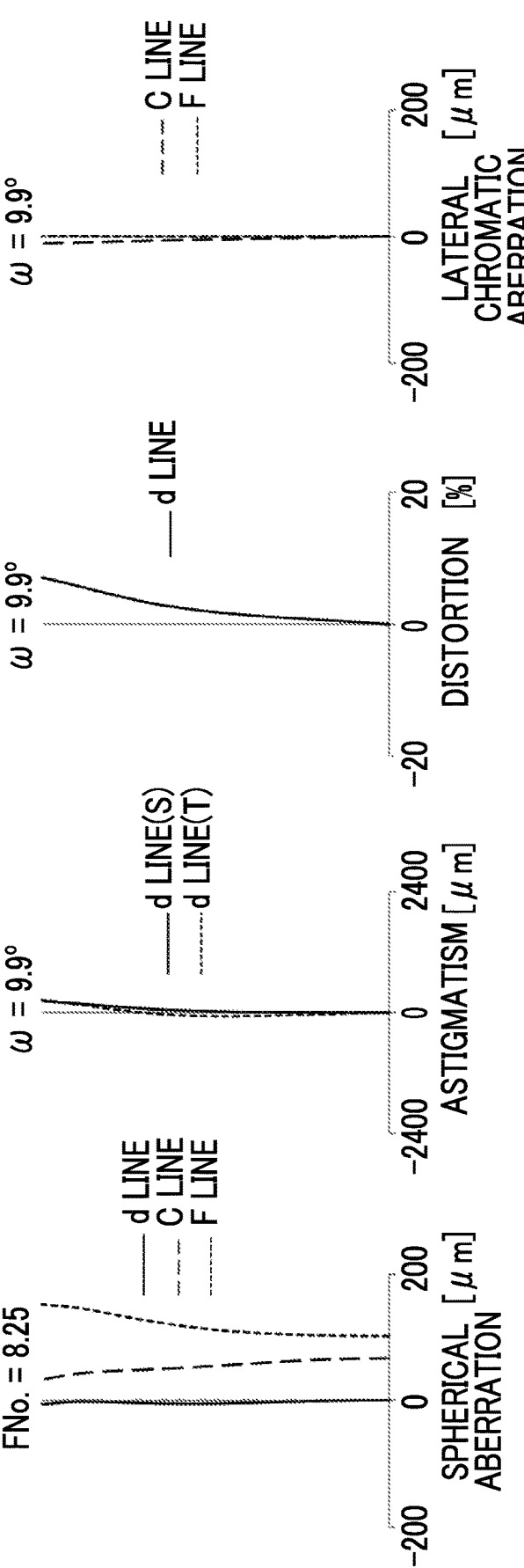
FIG. 9 is a diagram showing aberrations of the imaging lens of Example 4.

Regarding the imaging lens of Example 4, Table 10 shows the basic lens data, Table 11 shows the specifications, Table 12 shows the variable surface spacings, Table 13 shows the aspherical coefficients, and FIG. 9 shows aberration diagrams in a state where the infinite distance object is in focus.

In basic lens data, a reference sign * is attached to surface numbers of aspherical surfaces, and numerical values of the paraxial curvature radius are written into the column of the curvature radius of the aspherical surface. In Table 13, the row of Sn shows surface numbers of the aspherical surfaces, and the rows of KA and Am show numerical values of the aspherical coefficients for each aspherical surface. m is an integer of 3 or more. For example, m=4, 6, 8, and 10 for the 2first surface of Example 4. The "E±n" (n: an integer) in numerical values of the aspherical coefficients of Table 13 indicates "×10$^{\pm n}$". KA and Am are the aspherical coefficients in the aspherical surface expression represented by the following expression.

$$Zd = C \times h^2/\{1+(1-KA \times C^2 \times h^2)^{1/2}\} + \in Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical coefficients, and Σ in the aspherical surface expression means the sum with respect to m. Unless otherwise specified, the symbols, meanings, and description methods of the aspherical coefficients are the same for the following Examples.

TABLE 10

| | | Example 4 | | | |
|---|---|---|---|---|---|
| Sn | R | D | Nd | vd | VigD |
| 1 | 53.8206 | 1.4997 | 1.91082 | 35.25 | |
| 2 | 122.2650 | 0.1003 | | | |
| 3 | 19.8823 | 3.7466 | 1.49700 | 81.54 | |
| 4 | 162.3934 | 1.3658 | | | |
| 5 | −49.3926 | 1.5003 | 1.79637 | 47.20 | |
| 6 | 155.6484 | 2.0460 | 1.56506 | 42.80 | |
| 7 | −39.5378 | 0.1002 | | | 16 |
| 8 | 40.0763 | 1.9664 | 1.91082 | 35.25 | |
| 9 | 13.2902 | 3.1124 | 1.49700 | 81.54 | |
| 10 | 109.5285 | 1.4995 | | | |
| 11(St) | ∞ | DD[11] | | | |
| 12 | 26.3386 | 4.9422 | 1.53325 | 54.58 | |
| 13 | 91.4493 | 1.0004 | 1.75791 | 52.21 | |
| 14 | 19.0967 | DD[14] | | | 11 |
| 15 | 240.7391 | 1.9254 | 1.83768 | 29.52 | 9.6 |
| 16 | −13.0409 | 1.5096 | 1.81600 | 46.55 | |
| 17 | 26.5756 | 1.1175 | | | |
| 18 | 26.0718 | 4.1994 | 1.59335 | 38.66 | |
| 19 | −12.9147 | 1.5003 | 1.62713 | 60.11 | |
| 20 | 35.9459 | 1.5005 | | | |
| *21 | 51.6145 | 2.6935 | 1.62884 | 35.12 | |
| *22 | −36.7920 | 3.3236 | | | |
| 23 | −22.0356 | 1.4004 | 1.94595 | 17.98 | |
| 24 | −70.9972 | 33.9835 | | | |
| 25 | ∞ | 3.2000 | 1.51680 | 64.20 | |
| 26 | ∞ | 0.0000 | | | |

TABLE 11

| Example 4 | |
| --- | --- |
| f | 145.66 |
| FNo. | 8.25 |
| 2ω(°) | 19.8 |
| Ymax | 27.35 |

TABLE 12

| Example 4 | | |
| --- | --- | --- |
| | Infinity | 1.5 m |
| DD[11] | 1.5001 | 5.0833 |
| DD[14] | 11.1792 | 7.5960 |

TABLE 13

| | Example 4 | |
| --- | --- | --- |
| Sn | 21 | 22 |
| KA | 1.0000000E+00 | 1.0000000E+00 |
| A4 | −4.4139451E−06 | −1.1469551E−05 |
| A6 | 4.5096851E−07 | 3.5960617E−07 |
| A8 | −5.4709270E−09 | −3.6595035E−09 |
| A10 | 2.6265152E−11 | 1.6525355E−11 |

Example 5

Figure 10:
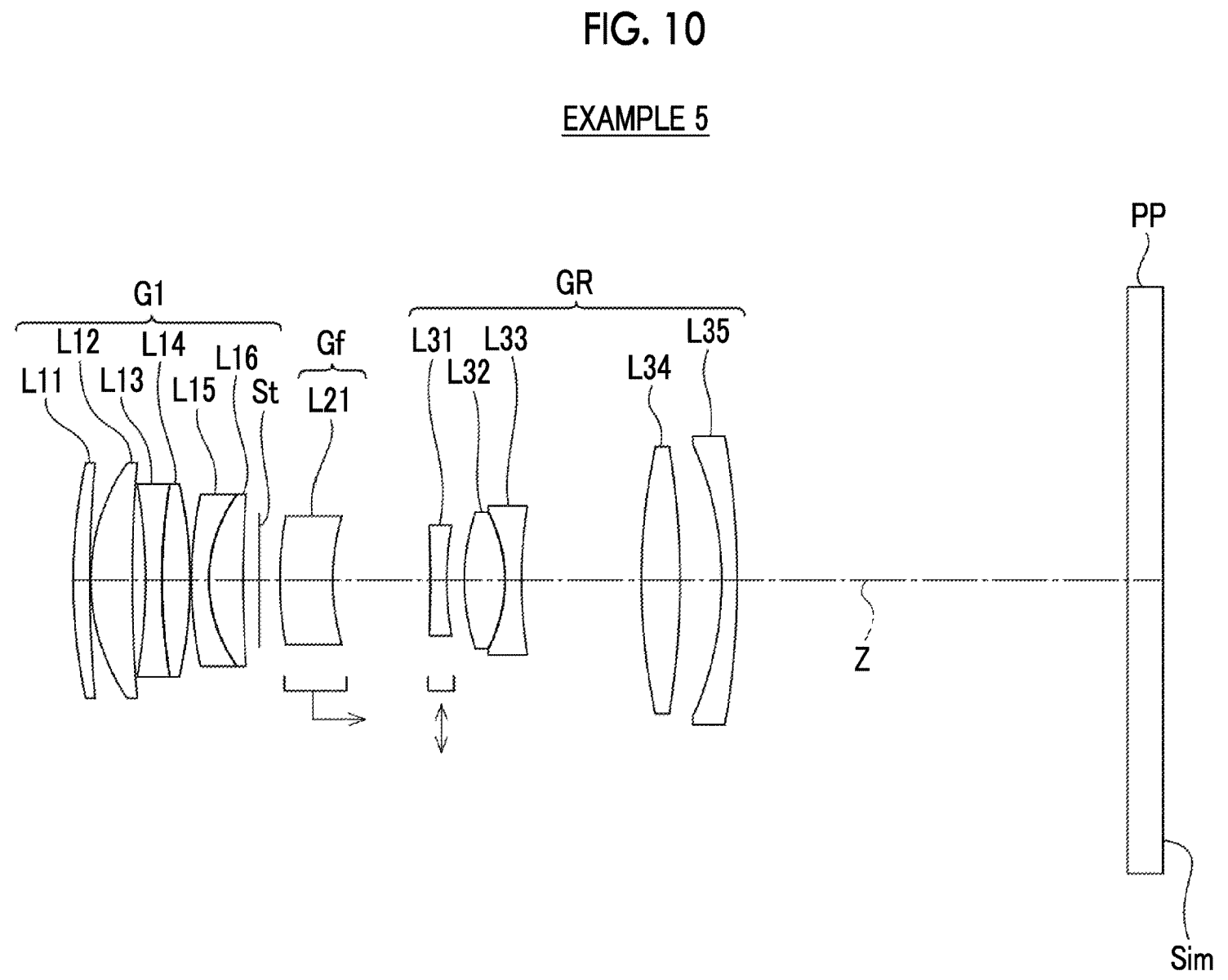

FIG. 10 is a cross-sectional view of a configuration of an imaging lens of Example 5. The imaging lens of Example 5 consists of, in order from the object side to the image side, a first lens group G1, a focus lens group Gf, and a rear lens group GR. During focusing from the infinite distance object to the close range object, the entire focus lens group Gf is integrally moved to the image side, and the first lens group G1 and the rear lens group GR remain stationary with respect to the image plane Sim.

The first lens group G1 consists of six lenses L11 to L16 and an aperture stop St, in order from the object side to the image side. The focus lens group Gf consists of one lens L21. The rear lens group GR consists of five lenses L31 to L35, in order from the object side to the image side. The vibration-proof group consists of the lens L31.

Figure 11:
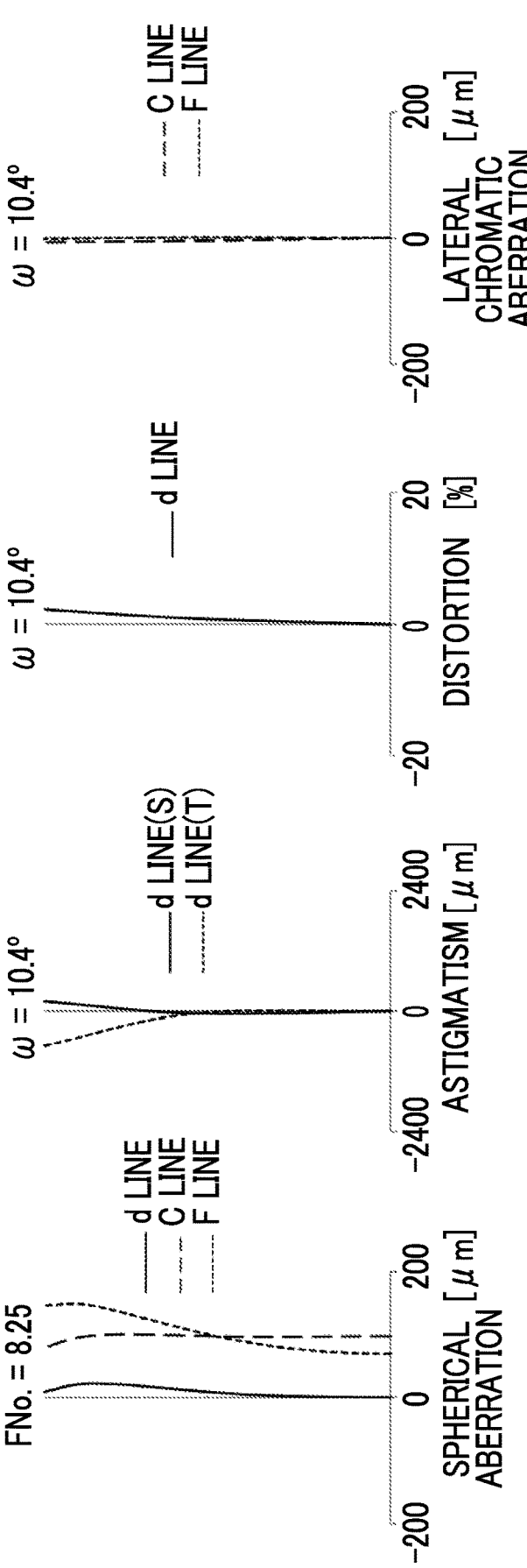
FIG. 11 is a diagram showing aberrations of the imaging lens of Example 5.

Regarding the imaging lens of Example 5, Table 14 shows the basic lens data, Table 15 shows the specifications, Table 16 shows the variable surface spacings, and FIG. 11 shows aberration diagrams in a state where the infinite distance object is in focus.

TABLE 14

| | Example 5 | | | | |
| --- | --- | --- | --- | --- | --- |
| Sn | R | D | Nd | vd | VigD |
| 1 | 52.8926 | 1.5145 | 1.91082 | 35.25 | |
| 2 | 123.9441 | 0.0999 | | | |
| 3 | 19.8428 | 3.7927 | 1.49700 | 81.54 | |
| 4 | 142.0566 | 1.2131 | | | |
| 5 | −53.7057 | 1.5002 | 1.72916 | 54.68 | |
| 6 | 58.1737 | 2.5690 | 1.54814 | 45.78 | |
| 7 | −41.2893 | 0.1346 | | | 16 |
| 8 | 40.5119 | 1.5834 | 1.91082 | 35.25 | |
| 9 | 13.8266 | 3.1481 | 1.49700 | 81.54 | |
| 10 | 116.2065 | 1.5005 | | | |

TABLE 14-continued

| | Example 5 | | | | |
| --- | --- | --- | --- | --- | --- |
| Sn | R | D | Nd | vd | VigD |
| 11(St) | ∞ | DD[11] | | | |
| 12 | 33.1473 | 4.7492 | 1.70300 | 52.38 | |
| 13 | 21.2486 | DD[13] | | | |
| 14 | −124.2948 | 1.5001 | 1.77250 | 49.61 | 9.6 |
| 15 | 28.9818 | 1.6142 | | | |
| 16 | 20.9913 | 3.7527 | 1.60342 | 38.03 | |
| 17 | −13.9523 | 1.5002 | 1.72916 | 54.68 | |
| 18 | 44.6960 | 10.9657 | | | |
| 19 | 62.5055 | 3.5148 | 1.84667 | 23.79 | |
| 20 | −79.2801 | 3.8686 | | | |
| 21 | −31.3257 | 1.4001 | 1.94595 | 17.98 | |
| 22 | −82.0545 | 35.6132 | | | |
| 23 | ∞ | 3.2000 | 1.51680 | 64.20 | |
| 24 | ∞ | 0.0000 | | | |

TABLE 15

| Example 5 | |
| --- | --- |
| f | 145.61 |
| FNo. | 8.25 |
| 2ω(°) | 20.8 |
| Ymax | 27.35 |

TABLE 16

| Example 5 | | |
| --- | --- | --- |
| | Infinity | 1.5 m |
| DD[11] | 1.8592 | 6.6239 |
| DD[13] | 8.9229 | 4.1582 |

EXAMPLE

Figure 12:
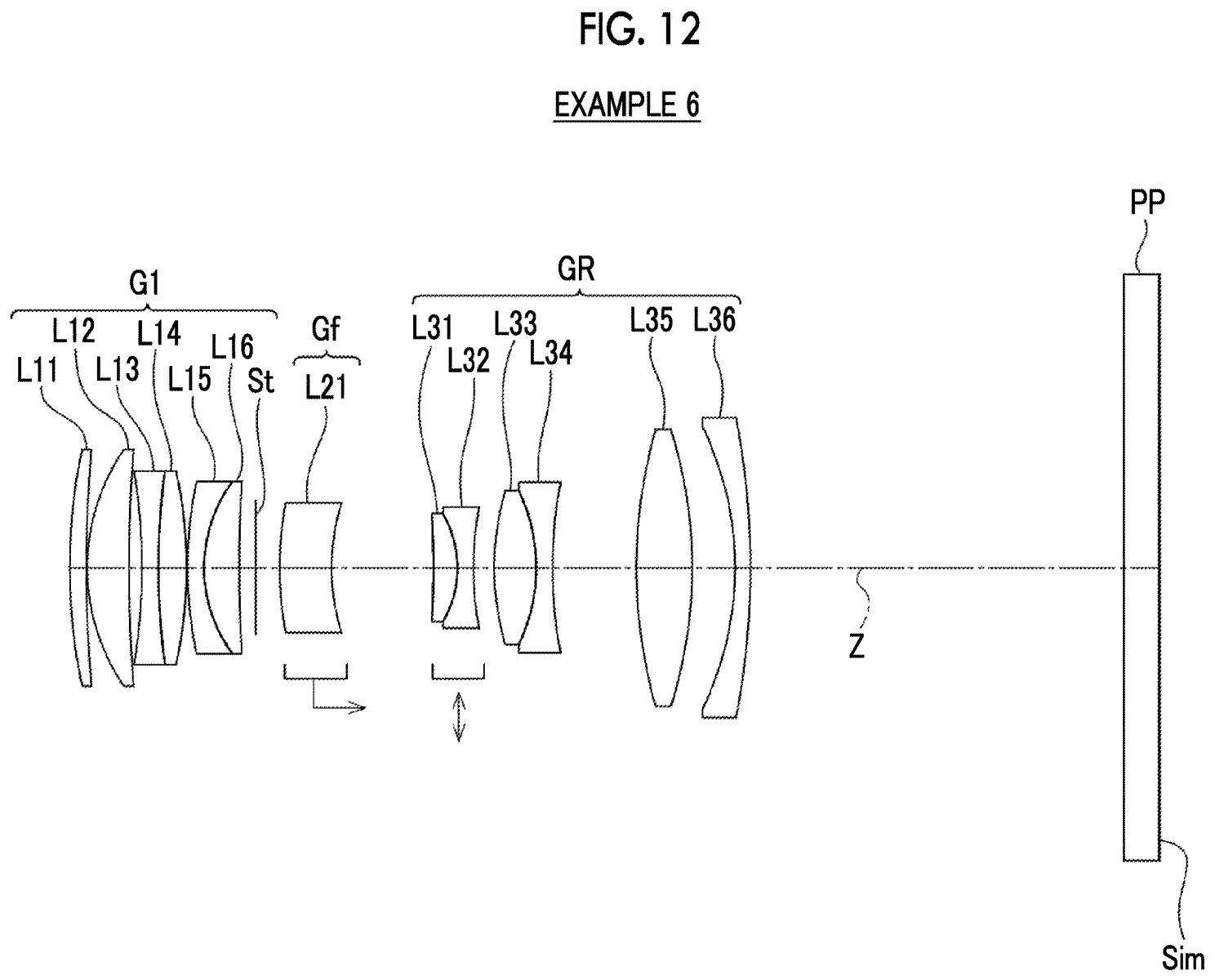

FIG. 12 is a cross-sectional view of a configuration of an imaging lens of Example 6. The imaging lens of Example 6 consists of, in order from the object side to the image side, a first lens group G1, a focus lens group Gf, and a rear lens group GR. During focusing from the infinite distance object to the close range object, the entire focus lens group Gf is integrally moved to the image side, and the first lens group G1 and the rear lens group GR remain stationary with respect to the image plane Sim.

The first lens group G1 consists of six lenses L11 to L16 and an aperture stop St, in order from the object side to the image side. The focus lens group Gf consists of one lens L21. The rear lens group GR consists of six lenses L31 to L36, in order from the object side to the image side. The vibration-proof group consists of a lens L31 and a lens L32.

Figure 13:
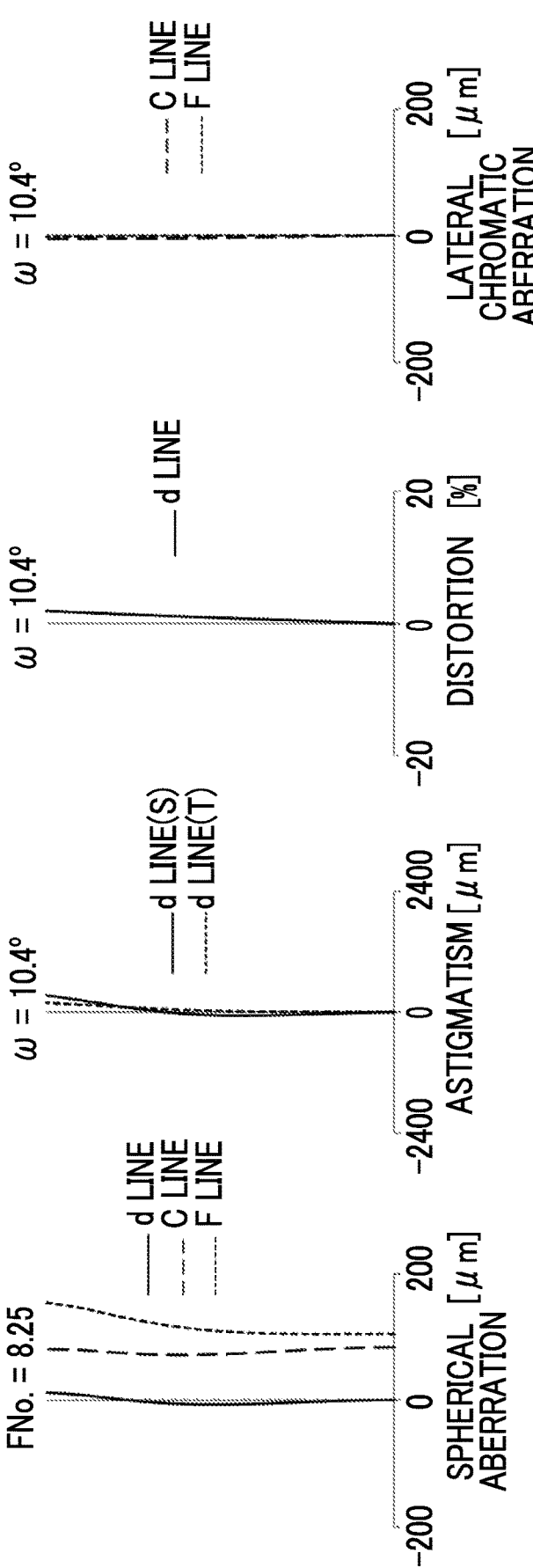
FIG. 13 is a diagram showing aberrations of the imaging lens of Example 6.

Regarding the imaging lens of Example 6, Table 17 shows the basic lens data, Table 18 shows the specifications, Table 19 shows the variable surface spacings, and FIG. 13 shows aberration diagrams in a state where the infinite distance object is in focus.

TABLE 17

| | Example 6 | | | | |
| --- | --- | --- | --- | --- | --- |
| Sn | R | D | Nd | vd | VigD |
| 1 | 53.6674 | 1.5120 | 1.91082 | 35.25 | |

TABLE 17-continued

Example 6

| Sn | R | D | Nd | vd | VigD |
|---|---|---|---|---|---|
| 2 | 125.3378 | 0.1004 | | | |
| 3 | 19.9202 | 3.7965 | 1.49700 | 81.54 | |
| 4 | 149.6770 | 1.1980 | | | |
| 5 | −53.9042 | 1.5005 | 1.71300 | 53.83 | |
| 6 | 69.3397 | 2.5628 | 1.53172 | 48.85 | |
| 7 | −41.9773 | 0.1005 | | | 16 |
| 8 | 40.1036 | 1.5005 | 1.91082 | 35.25 | |
| 9 | 13.5963 | 3.2522 | 1.49700 | 81.54 | |
| 10 | 139.0641 | 1.5000 | | | |
| 11(St) | ∞ | DD[11] | | | |
| 12 | 32.4925 | 4.7497 | 1.61309 | 60.61 | |
| 13 | 20.5761 | DD[13] | | | |
| 14 | −87.9760 | 2.2027 | 1.80610 | 33.27 | 9.6 |
| 15 | −10.0417 | 1.5003 | 1.81600 | 46.55 | |
| 16 | 29.5183 | 1.8977 | | | |
| 17 | 25.3837 | 3.8321 | 1.59551 | 39.23 | |
| 18 | −16.6772 | 1.5001 | 1.69680 | 56.20 | |
| 19 | 44.0247 | 7.5650 | | | |
| 20 | 48.0163 | 5.0804 | 1.64769 | 33.84 | |
| 21 | −43.8702 | 3.9767 | | | |
| 22 | −29.9832 | 1.4005 | 1.94595 | 17.98 | |
| 23 | −73.7262 | 34.1033 | | | |
| 24 | ∞ | 3.2000 | 1.51680 | 64.20 | |
| 25 | ∞ | 0.0000 | | | |

TABLE 18

Example 6

| f | 145.68 |
|---|---|
| FNo. | 8.25 |
| 2ω(°) | 20.8 |
| Ymax | 27.35 |

TABLE 19

Example 6

| | Infinity | 1.5 m |
|---|---|---|
| DD[11] | 2.1894 | 7.3364 |
| DD[13] | 9.2795 | 4.1326 |

Example 7

Figure 14:
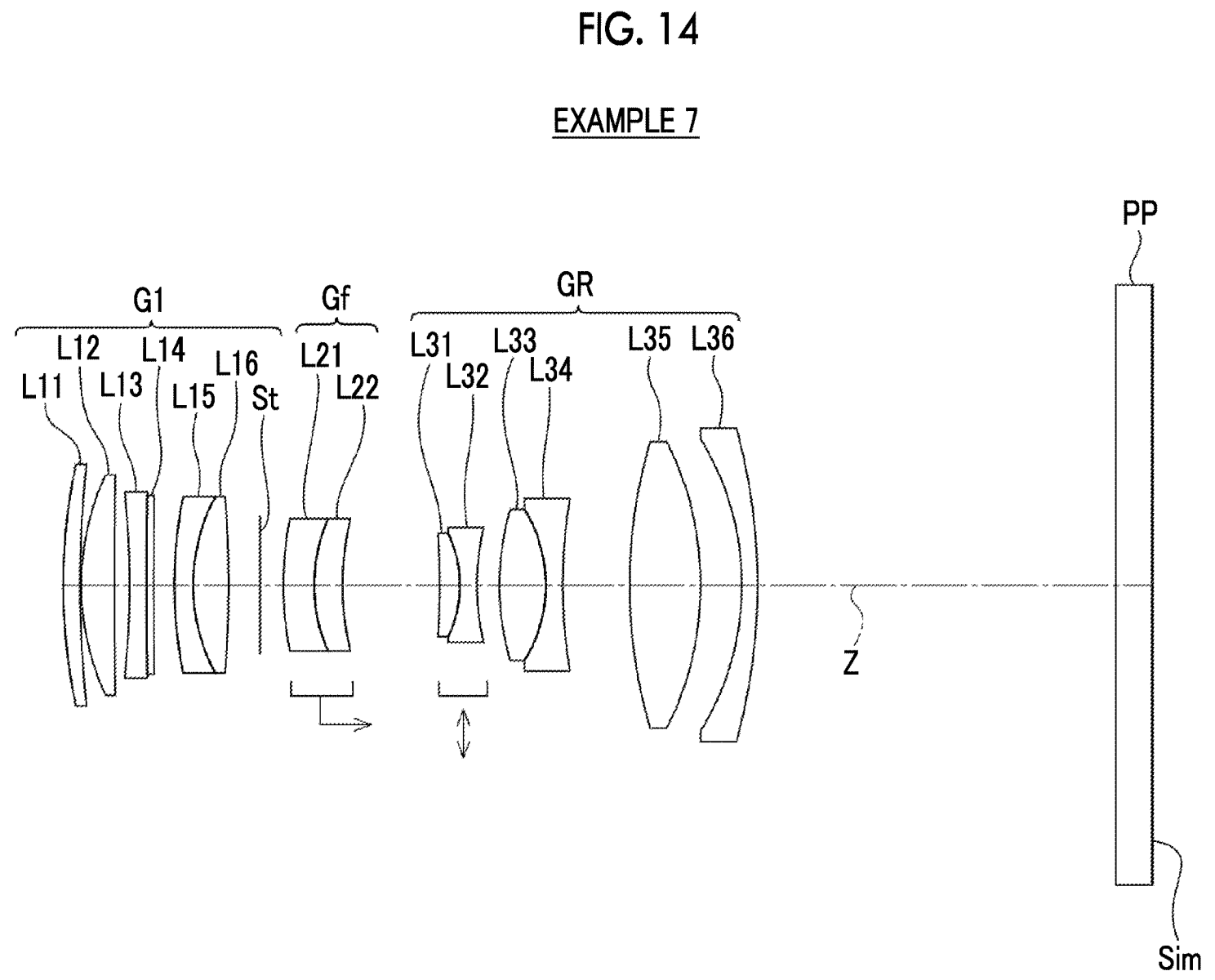

FIG. 14 is a cross-sectional view of a configuration of an imaging lens of Example 7. The imaging lens of Example 7 consists of, in order from the object side to the image side, a first lens group G1, a focus lens group Gf, and a rear lens group GR. During focusing from the infinite distance object to the close range object, the entire focus lens group Gf is integrally moved to the image side, and the first lens group G1 and the rear lens group GR remain stationary with respect to the image plane Sim.

The first lens group G1 consists of six lenses L11 to L16 and an aperture stop St, in order from the object side to the image side. The focus lens group Gf consists of two lenses L21 and L22, in order from the object side to the image side. The rear lens group GR consists of six lenses L31 to L36, in order from the object side to the image side. The vibration-proof group consists of a lens L31 and a lens L32.

Figure 15:
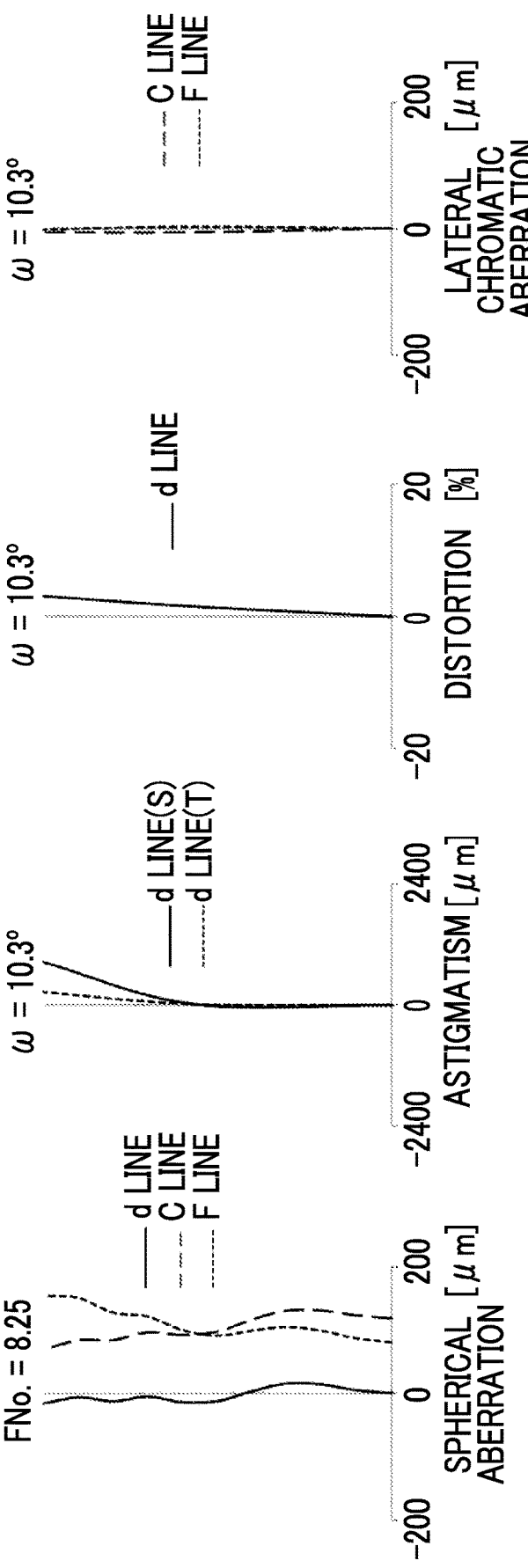
FIG. 15 is a diagram showing aberrations of the imaging lens of Example 7.

Regarding the imaging lens of Example 7, Table 20 shows the basic lens data, Table 21 shows the specifications, Table 22 shows the variable surface spacings, Table 23 shows the aspherical coefficients, and FIG. 15 shows aberration diagrams in a state where the infinite distance object is in focus.

TABLE 20

Example 7

| Sn | R | D | Nd | vd | VigD |
|---|---|---|---|---|---|
| 1 | 54.7942 | 1.5004 | 1.91082 | 35.25 | |
| 2 | 108.7645 | 0.0997 | | | |
| 3 | 24.2556 | 2.9593 | 1.49700 | 81.54 | |
| 4 | 783.5374 | 1.3941 | | | |
| 5 | −79.0677 | 1.5001 | 1.64000 | 60.21 | |
| 6 | 383.3119 | 0.6500 | 1.59833 | 20.31 | |
| *7 | 490.4342 | 1.8522 | | | |
| 8 | 42.0909 | 1.6651 | 1.90366 | 31.32 | 15 |
| 9 | 17.1830 | 3.1591 | 1.49700 | 81.54 | |
| 10 | −101.4058 | 2.8157 | | | |
| 11(St) | ∞ | DD[11] | | | |
| 12 | 31.0121 | 2.7441 | 1.74693 | 51.01 | |
| 13 | 15.0369 | 2.5103 | 1.56732 | 42.81 | |
| 14 | 24.1060 | DD[14] | | | 11 |
| 15 | −78.5559 | 1.8375 | 1.85025 | 30.05 | 9 |
| 16 | −10.7712 | 1.5099 | 1.81600 | 46.55 | |
| 17 | 22.9573 | 1.9919 | | | |
| 18 | 24.2583 | 4.1493 | 1.60342 | 38.01 | |
| 19 | −13.2263 | 1.5005 | 1.78800 | 47.52 | |
| 20 | 47.0185 | 5.9424 | | | |
| 21 | 47.2146 | 6.3316 | 1.62004 | 36.26 | |
| 22 | −29.7474 | 3.6742 | | | |
| 23 | −25.8573 | 1.3996 | 1.94595 | 17.98 | |
| 24 | −54.7644 | 32.0661 | | | |
| 25 | ∞ | 3.2000 | 1.51680 | 64.20 | |
| 26 | ∞ | 0.0000 | | | |

TABLE 21

Example 7

| f | 145.66 |
|---|---|
| FNo. | 8.25 |
| 2ω(°) | 20.6 |
| Ymax | 27.35 |

TABLE 22

Example 7

| | Infinity | 1.5 m |
|---|---|---|
| DD[11] | 2.0738 | 6.9041 |
| DD[14] | 8.7158 | 3.8855 |

TABLE 23

Example 7

| Sn | 7 |
|---|---|
| KA | 1.0000000E+00 |
| A3 | 0.0000000E+00 |
| A4 | −2.1272702E−06 |
| A5 | 0.0000000E+00 |
| A6 | −3.1648017E−08 |
| A7 | 0.0000000E+00 |
| A8 | 1.0381418E−09 |
| A9 | 0.0000000E+00 |
| A10 | −8.9155235E−12 |
| A11 | 0.0000000E+00 |
| A12 | −3.4017350E−13 |
| A13 | 0.0000000E+00 |
| A14 | 8.9702198E−15 |
| A15 | 0.0000000E+00 |
| A16 | −7.6335774E−17 |
| A17 | 0.0000000E+00 |
| A18 | 2.6597878E−19 |
| A19 | 0.0000000E+00 |

TABLE 23-continued

| Example 7 | |
| --- | --- |
| Sn | 7 |
| A20 | −8.1110642E−22 |

Example 8

Figure 16:
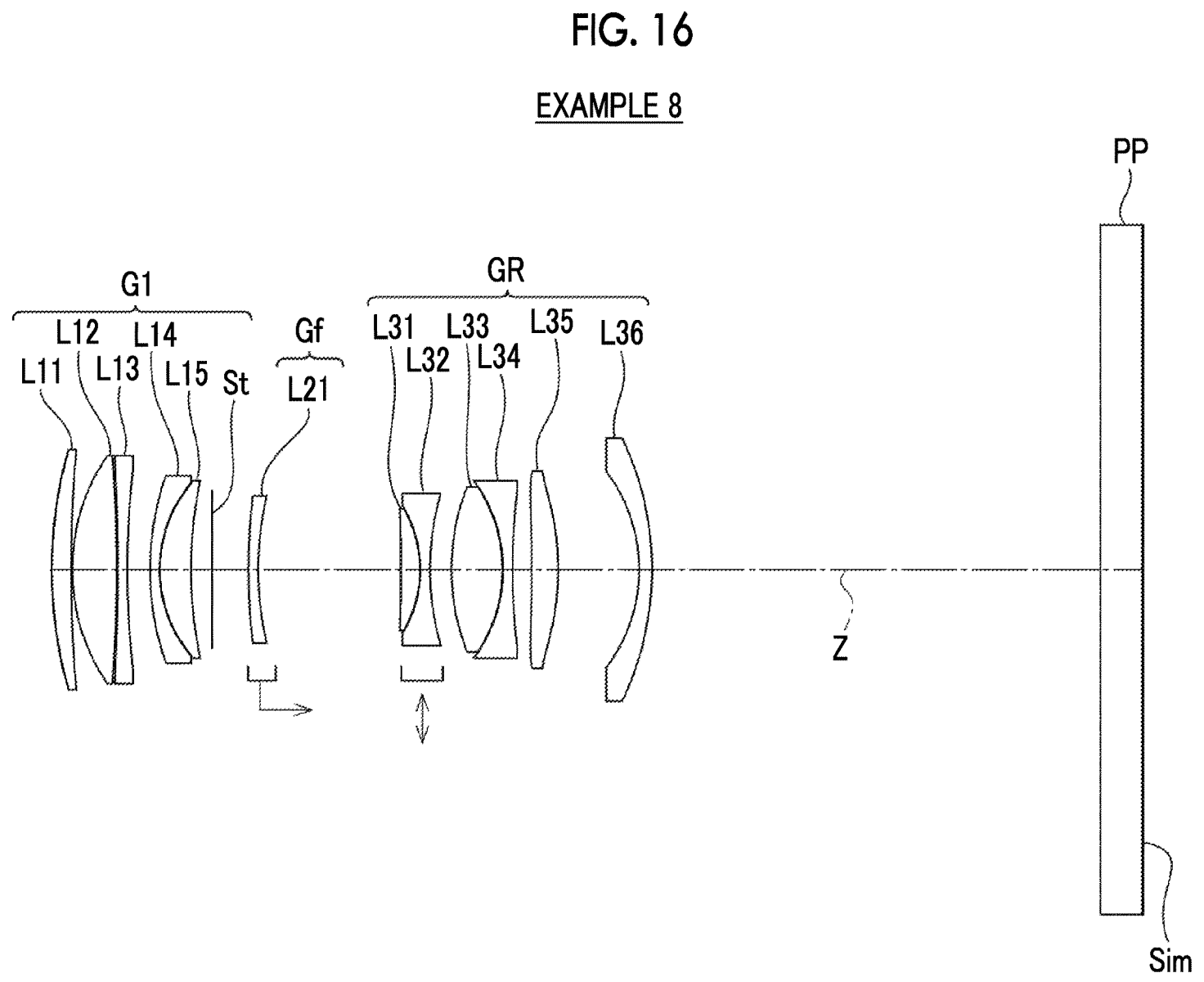

FIG. 16 is a cross-sectional view of a configuration of the imaging lens of Example 8. The imaging lens of Example 8 consists of, in order from the object side to the image side, a first lens group G1, a focus lens group Gf, and a rear lens group GR. During focusing from the infinite distance object to the close range object, the entire focus lens group Gf is integrally moved to the image side, and the first lens group G1 and the rear lens group GR remain stationary with respect to the image plane Sim.

The first lens group G1 consists of five lenses L11 to L15 and an aperture stop St, in order from the object side to the image side. The focus lens group Gf consists of one lens L21. The rear lens group GR consists of six lenses L31 to L36, in order from the object side to the image side. The vibration-proof group consists of a lens L31 and a lens L32.

Figure 17:
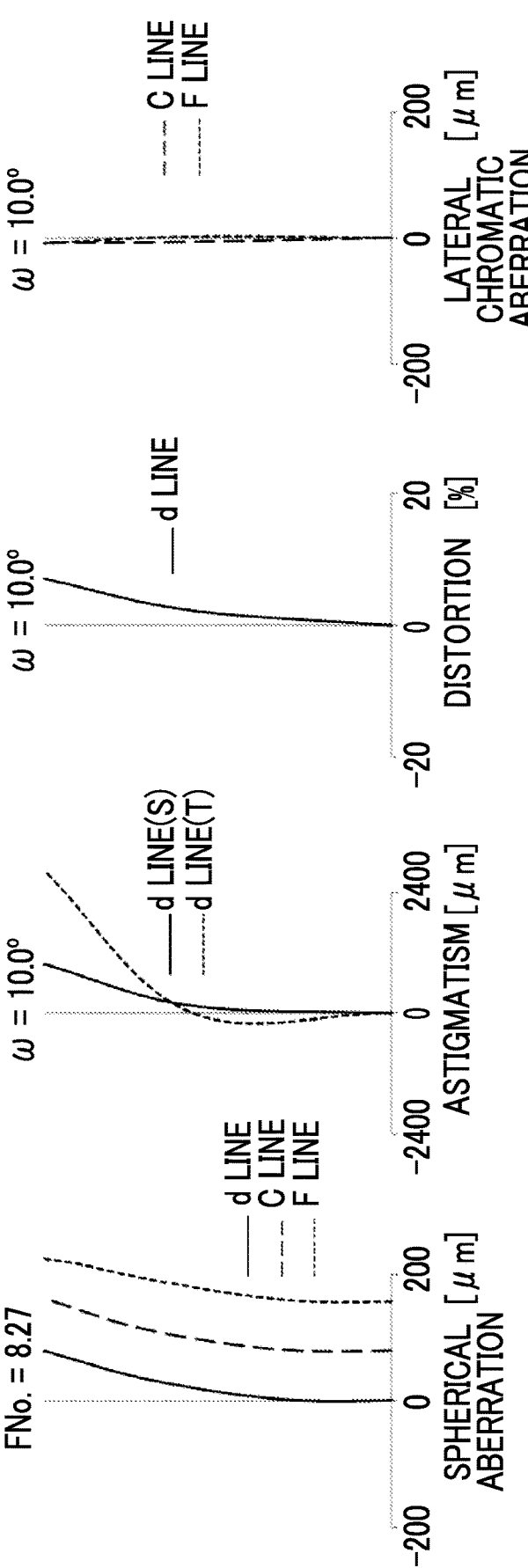
FIG. 17 is a diagram showing aberrations of the imaging lens of Example 8.

Regarding the imaging lens of Example 8, Table 24 shows the basic lens data, Table 25 shows the specifications, Table 26 shows the variable surface spacings, Table 27 shows the aspherical coefficients, and FIG. 17 shows aberration diagrams in a state where the infinite distance object is in focus.

TABLE 24

| | Example 8 | | | | |
| --- | --- | --- | --- | --- | --- |
| Sn | R | D | Nd | νd | VigD |
| 1 | 34.8890 | 1.5003 | 1.64769 | 33.84 | 18 |
| 2 | 110.1558 | 0.0996 | | | |
| 3 | 16.3772 | 3.4174 | 1.49700 | 81.54 | |
| 4 | −131.3364 | 0.0998 | | | |
| 5 | −165.4946 | 0.7496 | 1.80400 | 46.56 | |
| 6 | 73.4562 | 1.7591 | | | |
| 7 | 22.8923 | 0.7496 | 1.95375 | 32.32 | |
| 8 | 10.7113 | 2.4289 | 1.49700 | 81.54 | |
| 9 | 34.9713 | 1.6409 | | | |
| 10(St) | ∞ | DD[10] | | | |
| 11 | 48.1940 | 0.7496 | 1.49700 | 81.54 | |
| 12 | 25.4164 | DD[12] | | | |
| 13 | −153.2728 | 1.4995 | 1.71736 | 29.51 | 8.4 |
| 14 | −9.7557 | 0.7596 | 1.69680 | 56.20 | |
| 15 | 21.4924 | 1.6790 | | | |
| 16 | 18.0406 | 4.0098 | 1.60342 | 38.03 | |
| 17 | −11.9910 | 0.7500 | 1.75500 | 52.34 | |
| 18 | 51.5332 | 1.4996 | | | |
| *19 | −158.6476 | 2.0394 | 1.73077 | 40.51 | |
| *20 | −22.6813 | 6.2159 | | | |
| 21 | −13.0096 | 0.9996 | 1.94595 | 17.98 | |
| 22 | −24.4761 | 34.8473 | | | |
| 23 | ∞ | 3.2000 | 1.51680 | 64.20 | |
| 24 | ∞ | 0.0000 | | | |

TABLE 25

| Example 8 | |
| --- | --- |
| f | 145.51 |
| FNo. | 8.27 |
| 2ω(°) | 20.0 |
| Ymax | 27.35 |

TABLE 26

| | Example 8 | |
| --- | --- | --- |
| | Infinity | 2.5 m |
| DD[10] | 2.8502 | 4.8599 |
| DD[12] | 11.0620 | 9.0523 |

TABLE 27

| | Example 8 | |
| --- | --- | --- |
| Sn | 19 | 20 |
| KA | 1.0000000E+00 | 1.0000000E+00 |
| A3 | 0.0000000E+00 | 0.0000000E+00 |
| A4 | −2.1205300E−05 | −3.8823667E−05 |
| A5 | 1.8044024E−06 | 5.9301000E−06 |
| A6 | 9.0456964E−07 | −9.1042134E−07 |
| A7 | 2.2148081E−08 | 1.7532241E−07 |
| A8 | −4.7325902E−08 | 1.9758712E−09 |
| A9 | 6.0374595E−09 | −5.0642656E−09 |
| A10 | 1.0529713E−10 | 5.4447896E−10 |
| A11 | −1.0817473E−11 | 1.0840451E−11 |
| A12 | −2.3351531E−13 | 2.3179875E−13 |
| A13 | 5.9108346E−15 | −8.0529223E−15 |
| A14 | 5.8926615E−16 | −8.8052875E−17 |
| A15 | 2.0548262E−18 | −8.4284292E−18 |
| A16 | 1.1384101E−21 | −2.4878280E−21 |
| A17 | −5.0892911E−24 | 2.0106766E−23 |
| A18 | 0.0000000E+00 | 3.6697955E−25 |
| A19 | 0.0000000E+00 | −1.6079158E−27 |
| A20 | 0.0000000E+00 | −3.1199616E−29 |

Table 28 shows the corresponding values of Conditional Expressions (1) to (14) of the imaging lenses of the above-mentioned examples. Table 28 shows values in a case where the d line is set as a reference.

TABLE 28

| Expression number | | Example 1 | Example 2 | Example 3 | Example 4 |
| --- | --- | --- | --- | --- | --- |
| (1) | Ymax/f | 0.1880 | 0.1880 | 0.2030 | 0.1880 |
| (2) | TL/f | 0.6765 | 0.6764 | 0.8355 | 0.6244 |
| (3) | \|Dst5/Dst10\| | 0.3684 | 0.4207 | 0.2735 | 0.2635 |
| (4) | Pe/Ymax | 2.5005 | 2.4448 | 2.5867 | 2.0389 |
| (5) | (Rf − Rr)/(Rf + Rr) | −0.3551 | −0.2952 | −0.3656 | −0.5263 |
| (6) | (Rpr − Rf)/(Rpr + Rf) | 0.2220 | 0.1766 | 0.3553 | 0.2508 |
| (7) | νn | 17.98 | 17.98 | 17.98 | 17.98 |
| (8) | DG1/f | 0.1061 | 0.1214 | 0.1448 | 0.1061 |
| (9) | tanωi/tanω | 1.9947 | 1.9391 | 1.8629 | 2.8059 |
| (10) | φf/φr | 0.9967 | 0.8641 | 0.8259 | 1.0882 |
| (11) | Bf/Ymax | 1.3198 | 1.1754 | 1.1320 | 1.3197 |
| (12) | f1/f | 0.3468 | 0.3555 | 0.4192 | 0.3533 |
| (13) | fR/f | −0.3293 | −0.3545 | −0.7822 | −0.3110 |
| (14) | fv/f | −0.1851 | −0.1676 | −0.2385 | −0.2715 |

| Expression number | | Example 5 | Example 6 | Example 7 | Example 8 |
| --- | --- | --- | --- | --- |
| (1) | Ymax/f | 0.1880 | 0.1880 | 01880 | 0.1883 |
| (2) | TL/f | 0.6764 | 0.6764 | 0.6609 | 0.5751 |
| (3) | \|Dst5/Dst10\| | 0.3054 | 0.3851 | 0.4036 | 0.2597 |
| (4) | Pe/Ymax | 2.5229 | 2.4882 | 2.4008 | 2.0087 |
| (5) | (Rf − Rr)/(Rf + Rr) | −0.4474 | −0.4218 | −0.3586 | −0.3059 |
| (6) | (Rpr − Rf)/(Rpr + Rf) | 0.4336 | 0.1880 | 0.0700 | 0.2710 |
| (7) | νn | 17.98 | 17.98 | 17.98 | 17.98 |
| (8) | DG1/f | 0.1069 | 0.1067 | 0.1016 | 0.0744 |

TABLE 28-continued

| (9) | tanωi/tanω | 2.0327 | 2.0065 | 2.0506 | 2.8120 |
|-----|-----------|--------|--------|--------|--------|
| (10) | φf/φr | 0.7686 | 0.7430 | 0.6640 | 1.0309 |
| (11) | Bf/Ymax | 1.3793 | 1.3241 | 1.2496 | 1.3513 |
| (12) | fl/f | 0.3472 | 0.3555 | 0.4192 | 0.3533 |
| (13) | fR/f | −0.3203 | −0.2917 | −0.2352 | −0.2048 |
| (14) | fv/f | −0.2082 | −0.1793 | −0.1571 | −0.1959 |

Figure 18:
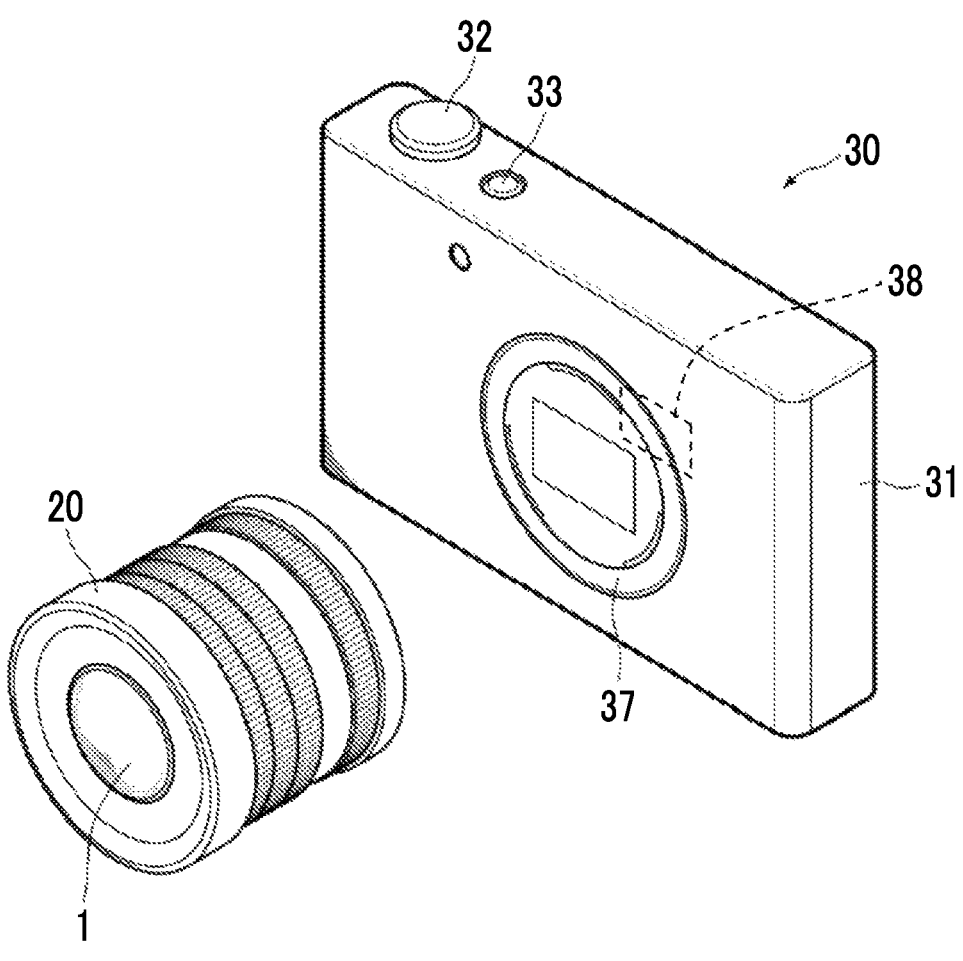
FIG. 18 is a perspective view of the front side of the imaging apparatus according to an embodiment.
Figure 19:
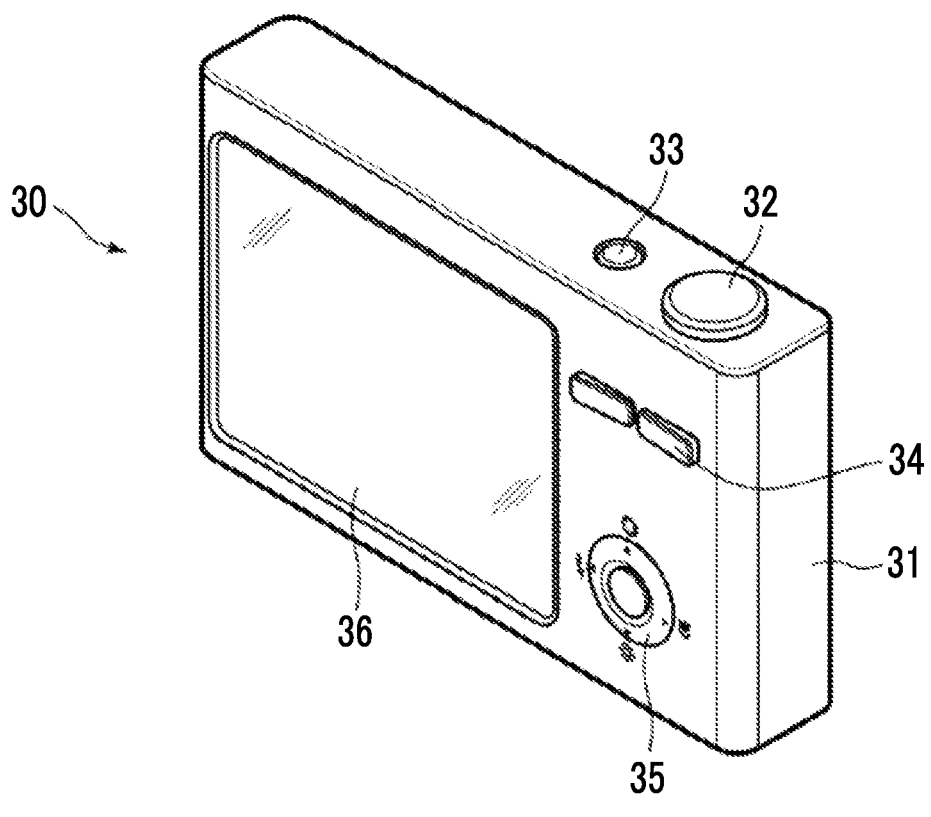
FIG. 19 is a perspective view of the rear side of the imaging apparatus according to the embodiment.

Next, an imaging apparatus according to an embodiment of the present disclosure will be described. FIGS. 18 and 19 are external views of a camera 30 which is the imaging apparatus according to the embodiment of the present disclosure. FIG. 18 is a perspective view of the camera 30 viewed from a front side, and FIG. 19 is a perspective view of the camera 30 viewed from a rear side. The camera 30 is a so-called mirrorless type digital camera, and the interchangeable lens 20 can be removably mounted thereon. The interchangeable lens 20 is configured to include the imaging lens 1, which is housed in a lens barrel, according to an embodiment of the present disclosure. The imaging lens 1 forms an optical image of a subject.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is capable of displaying a live view image of the subject within the angle of view before imaging, an image captured when the shutter button 32 is pressed, a recorded image, various types of information, and the like, in response to an operation by a user.

An imaging aperture, through which light from a subject is incident, is provided at the center on the front surface of the camera body 31. A mount 37 is provided at a position corresponding to the imaging aperture. The interchangeable lens 20 is mounted on the camera body 31 with the mount 37 interposed therebetween.

The camera 30 comprises an imaging element 38 in the camera body 31. The imaging element 38 captures an optical image which is formed by the imaging lens 1 and outputs a signal of the captured image. For example, as the imaging element 38, it is possible to use a charge coupled device (CCD) image sensor, a complementary metal oxide semiconductor (CMOS) image sensor, and the like. The imaging element 38 has an imaging region 38A (refer to FIGS. 20 and 22) in which a plurality of pixels that photoelectrically convert the received light into an electrical signal are arranged two-dimensionally. The imaging region 38A has a size which is capable of imaging an optical image having a size corresponding to the maximum angle of view of the imaging lens 1. The imaging element 38 is disposed such that the imaging surface coincides with a position of the image plane Sim of the imaging lens 1. It should be noted that the term "coincide" here includes a practically acceptable error. In the state of the above-mentioned disposition, the maximum value of the angle of view at which an image can be captured in the entire region of the imaging region 38A is referred to as a maximum imaging angle of view of the imaging element 38.

The camera 30 includes a processor (not shown in the drawing) that executes various kinds of processing such as image processing and output processing in the camera body 31. The processor processes the signal of the captured image which is output from the imaging element 38. For example, as the image processing, the processor executes, in addition to image correction processing, synthesis processing of synthesizing a plurality of captured images to create a composite image. Further, the processor creates a storage image on the basis of the captured image and the composite image, and executes the output processing of storing the created storage image in a storage medium such as a memory card. Further, the processor creates a display image on the basis of the captured image and the composite image, and executes output processing for displaying the created display image on the display unit 36.

Further, the processor is able to create an image having an angle of view narrower than the maximum imaging angle of view of the imaging element 38, and output the image as a display image and a storage image. This is a so-called digital zoom function, and an image corresponding to a partially enlarged image of the optical image can be output by the digital zoom. In order to create an image having a narrow angle of view, it is preferable that a region of a high angle of view with a relatively large amount of aberration is excluded from the optical image and a region of a low angle of view with a relatively small amount of aberration including the optical axis Z is used. However, even in a case where the region is selected in such a manner, a resolution of the enlarged image obtained only by the digital zoom using one captured image is lower than that of the captured image. Therefore, in order to obtain a high-resolution image, for example, it is preferable to use a combination of the composite image to be described below and the digital zoom.

Figure 20:
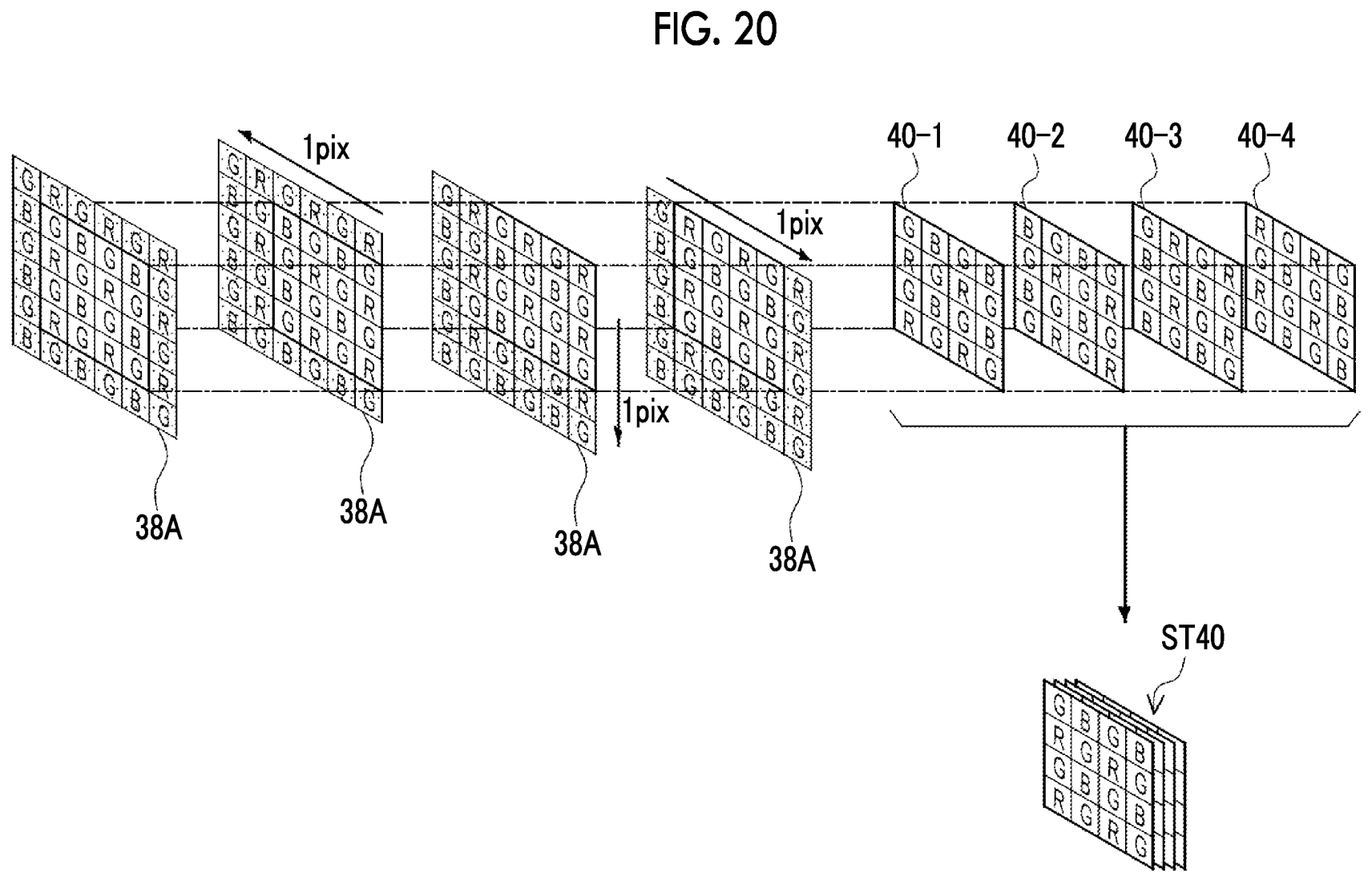
Figure 21:
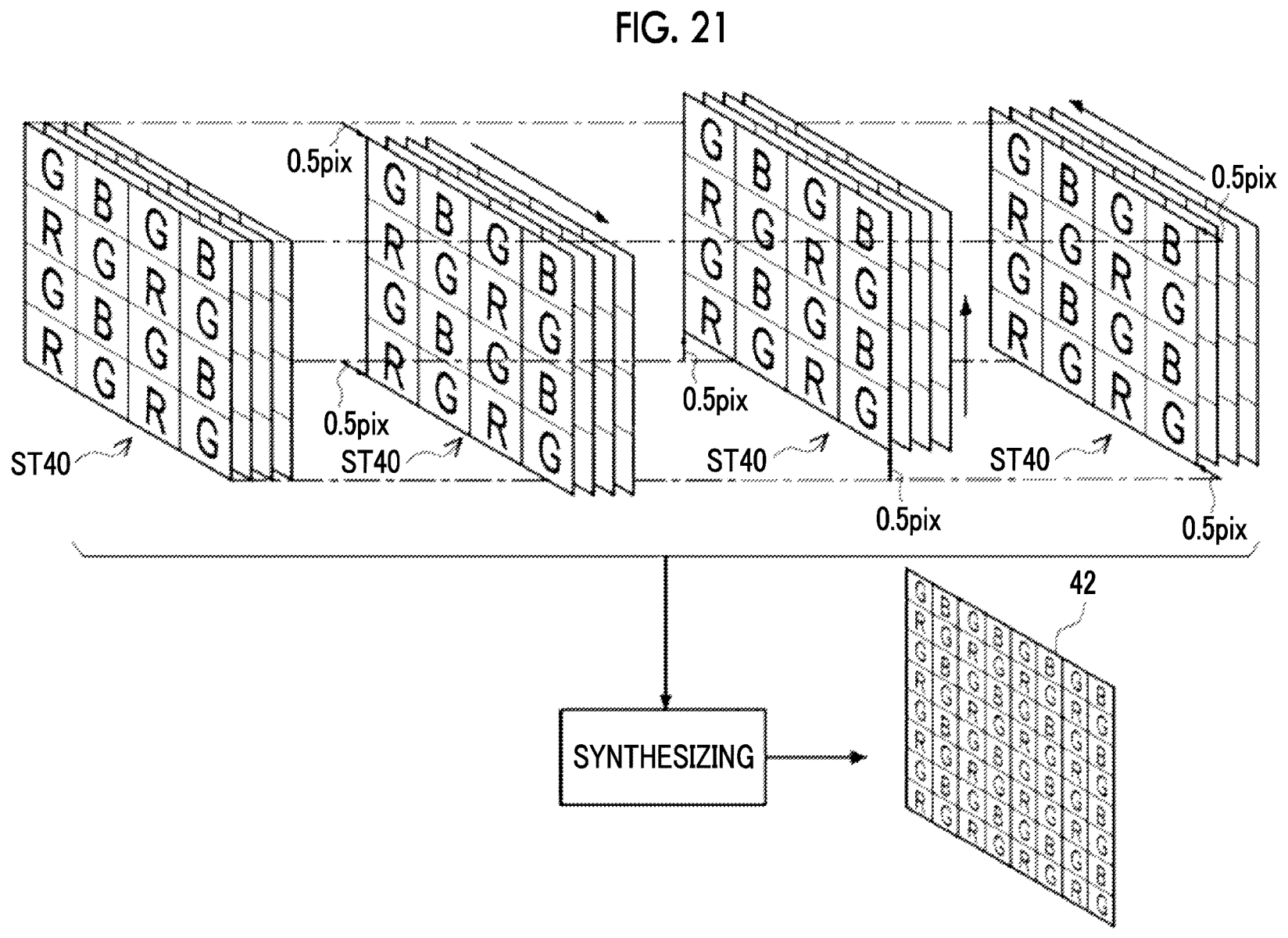

First, as an example of the synthesis processing for creating a composite image, synthesis processing using a so-called pixel shift technique will be described. The pixel shift is generally a technique for achieving an increase in resolution of an image. The pixel shift technique is a technique of acquiring a plurality of captured images by imaging at a plurality of shifted positions while shifting the imaging element 38 in a direction orthogonal to the optical axis Z of the imaging lens 1, that is, in a direction parallel to the imaging surface. The synthesis processing using the pixel shift technique is processing of obtaining a composite image having a resolution higher than the resolution of the captured image by synthesizing a plurality of captured images acquired by the pixel shift. FIGS. 20 and 21 show, as an example, the synthesis processing using the pixel shift technique, in a case of using a color sensor having an imaging region 38A, in which pixels corresponding to red (R), green (G), and blue (B) are arranged, as the imaging element 38.

As shown in FIG. 20, the plurality of pixels of RGB are two-dimensionally arranged in the imaging region 38A of the imaging element 38. The example of FIG. 20 is a Bayer array. In a region in which four adjacent pixels are squarely arranged, two G pixels are arranged at positions in one diagonal direction, and B and R pixels are arranged respectively at positions in the other diagonal direction. FIG. 20 shows a part of the imaging region 38A.

As described above, in the imaging region 38A, since the RGB pixels are two-dimensionally arranged, only a signal of any one of the three RGB colors can be acquired at the position of each pixel. The processing shown in FIG. 20 is processing for acquiring signals of three colors of RGB at the positions of the respective pixels by using the pixel shift technique. To be precise, as shown in FIG. 20, the imaging element 38 is shifted by one pixel at a time in accordance with the square array of four pixels of the R pixel×1, the G pixel×2, and the B pixel×1. Thereby, a captured image is acquired at each of the four shift positions. In FIG. 20, an amount of shift of the imaging element 38 is indicated by "1 pix", and a shift direction is indicated by the arrow.

In FIG. 20, assuming that the leftmost side is a reference position of the imaging region 38A, the second shift position from the left side is a position shifted by one pixel from the reference position to the left in the drawing. The third shift position is a position shifted downward by one pixel in the drawing from the second shift position. The fourth shift position is a position shifted by one pixel to the right in the drawing from the third shift position. The captured images 40-1 to 40-4 in FIG. 20 are captured images which are captured at four positions including the reference position and the shift positions. Focusing on four pixels at the same position in the four captured images 40-1 to 40-4, each captured image is a combination of four pixels of R pixel×1, G pixel×2, and B pixel×1. Thereby, it is possible to acquire a signal of an accurate color including three colors of RGB, instead of a signal of a single color, at the position of one pixel. The four captured images 40-1 to 40-4 shown in FIG. 20 are referred to as an image set ST40 as a group of four images.

FIG. 21 is an explanatory diagram of pixel shift for the purpose of achieving an increase in resolution. The resolution of the captured image is defined by the number of pixels in the imaging region 38A. The processing shown in FIG. 21 is processing of acquiring the image set ST40 at each of the four shift positions by shifting the imaging element 38 by 0.5 pixel, which is a half of the adjacent pixel pitch, in the direction orthogonal to the optical axis Z. In FIG. 21, an amount of shift of the imaging element 38 is indicated by "0.5 pix", and a shift direction is indicated by the arrow. It should be noted that, in FIG. 21, in order to avoid complication of the drawing, the imaging region 38A is not shown, and the position of the imaging region 38A is represented by the position of the image set ST40.

In FIG. 21, assuming that the leftmost side is a reference position of the imaging region 38A (indicated by the image set ST40), the second shift position from the left side is a position shifted by 0.5 pixel from the reference position to the right in the drawing. The third shift position is a position shifted upward by 0.5 pixel in the drawing from the second shift position. The fourth shift position is a position shifted by 0.5 pixel to the left in the drawing from the third shift position. Also at each shift position shown in FIG. 21, the image set ST40 including the four captured images 40-1 to 40-4 is acquired by performing the pixel shift shown in FIG. 20 and performing the pixel shift shown in FIG. 21. The four image sets ST40 acquired at respective shift positions shown in FIG. 21 are groups of images acquired at positions each of which is shifted by 0.5 pixel at a time. In the camera 30, the processor generates a composite image 42 by performing the synthesis processing using a total of 16 captured images included in the four image sets ST40. The composite image 42 is a high-definition image having a resolution four times a resolution of the captured image included in each image set ST40.

Figure 22:
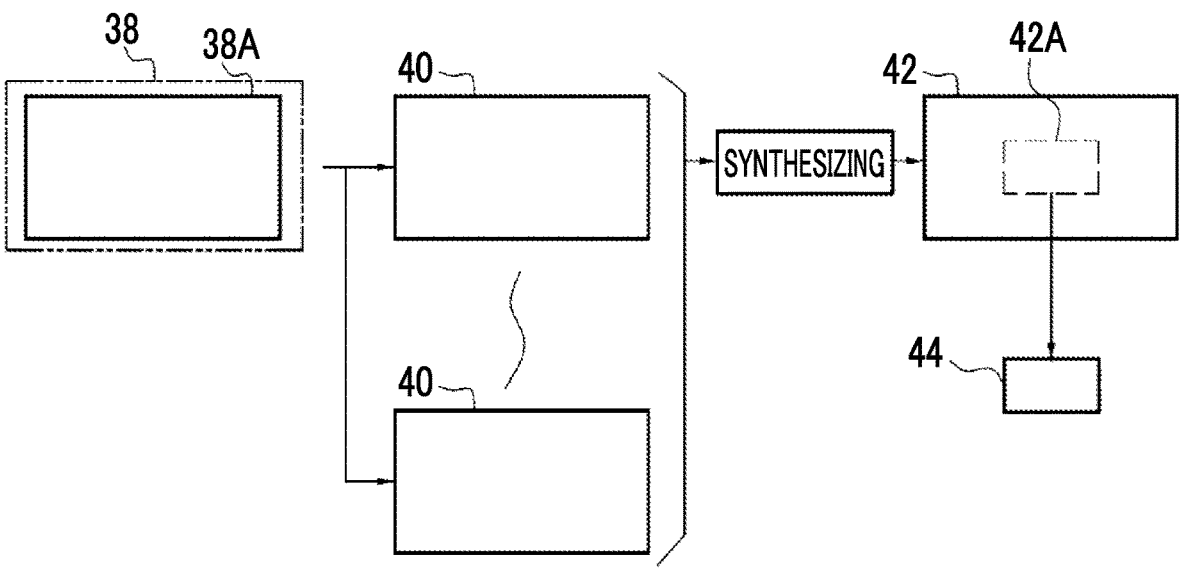
FIG. 22 is a conceptual diagram for explaining an example of a combination of a composite image and a digital zoom.

For example, FIG. 22 shows a conceptual diagram of a combination of the composite image 42 and the digital zoom. FIG. 22 mainly shows an approximate size of each image. The leftmost column of FIG. 22 shows an imaging region 38A corresponding to the maximum imaging angle of view of the imaging element 38. The second column from the left in FIG. 22 shows the plurality of captured images 40 captured by the imaging element 38. The plurality of captured images 40 are 16 captured images 40 obtained by using the above-mentioned pixel shift technique. The camera 30 creates the composite image 42 by synthesizing 16 captured images 40. The camera 30 outputs a composite image 42A having an angle of view narrower than the maximum imaging angle of view as a storage image 44 by trimming a part of the composite image 42.

The composite image 42 of FIG. 22 obtained by the above-mentioned pixel shift technique is an image having a resolution higher than the resolution of the captured image 40. A resolution of an enlarged image obtained only by a digital zoom using one captured image without performing such synthesis processing is reduced as compared with the resolution of the captured image 40. However, by combining the composite image 42 and the digital zoom, it is possible to present to a user an enlarged image in which the resolution thereof is not reduced as compared with the resolution of the captured image 40.

Figure 23:
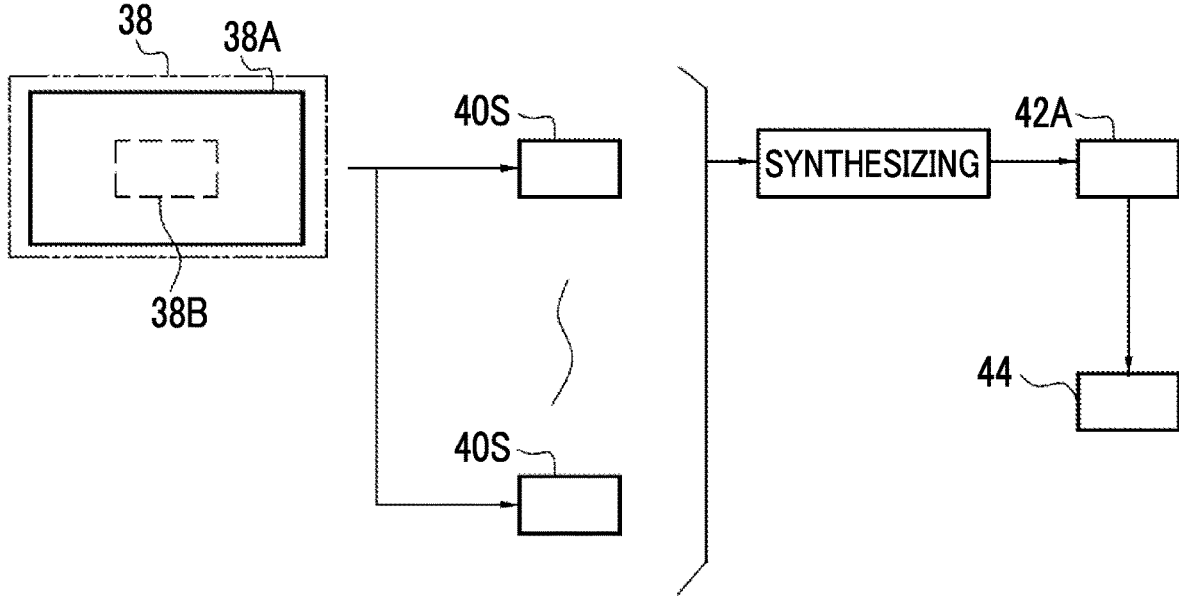
FIG. 23 is a conceptual diagram for explaining another example of the combination of the composite image and the digital zoom.

FIG. 23 shows an example of outputting the storage image 44 having the angle of view narrower than the maximum imaging angle of view by a method different from the method of FIG. 22. As compared with the example of FIG. 22, in the example of FIG. 23, the camera 30 acquires a plurality of captured images 40S instead of the plurality of captured images 40 of the example of FIG. 22. The captured images 40S are 16 captured images which are obtained by using the above-mentioned pixel shift technique, and are captured images captured in a partial region 38B of the imaging region 38A of the imaging element 38. Therefore, the captured image 40S is an captured image having the angle of view narrower than the maximum imaging angle of view of the imaging element 38. The camera 30 synthesizes the plurality of captured images 40S to create the composite image 42A having the angle of view narrower than the maximum imaging angle of view, and outputs the created composite image 42A as a storage image 44. Also in the method of FIG. 23, by combining the composite image 42A and the digital zoom, it is possible to present to a user an enlarged image in which the resolution is not reduced as compared with the resolution of the captured image 40S.

It should be noted that the above-mentioned example is an example, and the number of captured images used for creating the composite image and the amount of shift of the imaging element in the pixel shift technique may be different values from the above-mentioned example.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above-mentioned example, and may be modified into various forms such as a camera other than the mirrorless type, a film camera, and a video camera.

All documents, Patent Applications, and technical standards described in the present specification are incorporated into the present specification by reference to the same extent as in a case where the individual documents, Patent Applications, and technical standards were specifically and individually stated to be incorporated by reference.

What is claimed is:

1. An imaging lens comprising, successively in order from a position closest to an object side to an image side:
   a first lens group that remains stationary with respect to an image plane during focusing; and
   a focus lens group that moves along an optical axis during focusing, wherein assuming that a maximum image height is Ymax, a focal length of the imaging lens in a state where an infinite distance object is in focus is f, and a sum of a back focal length in terms of an air-equivalent distance and a distance on the optical axis from a lens surface closest to the object side in the first lens group to a lens surface closest to the image side in the imaging lens in a state where the infinite distance object is in focus is TL, Conditional Expressions (1) and (2) are satisfied, which are represented by $$0.1 < Ymax/f < 0.26 \tag{1, and}$$

$$0.4 < TL/f < 1.1 \tag{2, and}$$

wherein the imaging lens consists of, in order from the object side to the image side, the first lens group, the focus lens group that has a negative refractive power as a whole, and a rear lens group that remains stationary with respect to the image plane during focusing, and assuming that a focal length of the rear lens group is fR, Conditional Expression (13) is satisfied, which is represented by $$-0.9 < fR/f < -0.1 \tag{13}$$

2. The imaging lens according to claim 1, wherein assuming that an amount of distortion at an image height, which is 50% of the maximum image height in a state where the infinite distance object is in focus, is Dst5, and an amount of distortion at the maximum image height in a state where the infinite distance object is in focus is Dst10, Conditional Expression (3) is satisfied, which is represented by $$0.2 < |Dst5/Dst10| < 0.6 \tag{3}$$

3. The imaging lens according to claim 1, wherein assuming that a distance on the optical axis from the image plane to an exit pupil position in a state where the infinite distance object is in focus is Pe, where a sign of Pe is positive in a case where the exit pupil position is closer to the object side than the image plane, and is negative in a case where the exit pupil position is closer to the image side than the image plane, Conditional Expression (4) is satisfied, which is represented by $$1.5 < Pe/Ymax < 3 \tag{4}$$

4. The imaging lens according to claim 1, further comprising a negative lens at a position closest to the image side, wherein assuming that a curvature radius of an object side surface of the negative lens is Rf, and a curvature radius of an image side surface of the negative lens is Rr, Conditional Expression (5) is satisfied, which is represented by $$-0.6 < (Rf-Rr)/(Rf+Rr) < -0.1 \tag{5}$$

5. The imaging lens according to claim 4, further comprising a positive lens adjacent to the negative lens on the object side of the negative lens, wherein assuming that a curvature radius of an image side surface of the positive lens is Rpr, Conditional Expression (6) is satisfied, which is represented by $$0.03 < (Rpr-Rf)/(Rpr+Rf) < 0.4 \tag{6}$$

6. The imaging lens according to claim 4, wherein assuming that an Abbe number of the negative lens based on a d line is vn, Conditional Expression (7) is satisfied, which is represented by $$12 < vn < 30 \tag{7}$$

7. The imaging lens according to claim 1, wherein assuming that a distance on the optical axis from the lens surface closest to the object side in the first lens group to a lens surface closest to the image side in the first lens group is DG1, Conditional Expression (8) is satisfied, which is represented by $$0.02 < DG1/f < 0.2 \tag{8}$$

8. The imaging lens according to claim 1, wherein assuming that a maximum half angle of view in a state where the infinite distance object is in focus is ω, and an angle between an axis parallel to the optical axis and a principal ray with the maximum image height toward the image plane from a lens closest to the image side in a state where the infinite distance object is in focus is ωi, Conditional Expression (9) is satisfied, which is represented by $$1.4 < \tan ωi / \tan ω < 3.6 \tag{9}$$

9. The imaging lens according to claim 1, wherein assuming that a maximum effective diameter of the lens surface closest to the object side in the first lens group is φf, and a maximum effective diameter of the lens surface closest to the image side in the imaging lens is φr, Conditional Expression (10) is satisfied, which is represented by $$0.2 < φf/φr < 1.5 \tag{10}$$

10. The imaging lens according to claim 1, wherein assuming that a back focal length in terms of the air-equivalent distance in a state where the infinite distance object is in focus is Bf, Conditional Expression (11) is satisfied, which is represented by $$0.4 < Bf/Ymax < 1.8 \tag{11}$$

11. The imaging lens according to claim 1, wherein the focus lens group has a negative refractive power as a whole.

12. The imaging lens according to claim 11, wherein the number of lenses included in the focus lens group is equal to or less than two.

13. The imaging lens according to claim 1, wherein assuming that a focal length of the first lens group is f1, Conditional Expression (12) is satisfied, which is represented by $$0.25 < f1/f < 0.5 \tag{12}$$

14. The imaging lens according to claim 1, wherein the imaging lens is provided in an imaging apparatus, and the imaging apparatus includes an imaging element that captures an optical image formed by the imaging lens, and is capable of outputting an image having an angle of view narrower than a maximum imaging angle of view of the imaging element.

15. The imaging lens according to claim 2, wherein the imaging lens is provided in an imaging apparatus, and the imaging apparatus includes an imaging element that captures an optical image formed by the imaging lens, and is capable of outputting an image having an angle of view narrower than a maximum imaging angle of view of the imaging element.

16. The imaging lens according to claim 15, wherein the imaging apparatus is capable of outputting the image having the angle of view narrower than the maximum imaging angle of view of the imaging element by using a composite image which is obtained by synthesizing a plurality of images captured by the imaging element.

17. The imaging lens according to claim 1, wherein the imaging lens is provided in an imaging apparatus, and the imaging apparatus includes an imaging element that captures an optical image formed by the imaging lens, and is capable of outputting an image having an angle of view narrower than a maximum imaging angle of view of the imaging element by using a composite image which is obtained by synthesizing a plurality of images captured by the imaging element.

18. An imaging apparatus comprising the imaging lens according to claim 1.

\* \* \* \* \*